United States Patent
Gustafson et al.

(10) Patent No.: US 11,369,903 B2
(45) Date of Patent: *Jun. 28, 2022

(54) LIQUID FILTER ARRANGEMENT AND METHODS

(71) Applicant: Donaldson Company, Inc., Minneapolis, MN (US)

(72) Inventors: Michael J. Gustafson, Minnetonka, MN (US); Kurt Joscher, Burnsville, MN (US); David B. Harder, Burnsville, MN (US); Brian Tucker, Farmington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/994,899

(22) Filed: Aug. 17, 2020

(65) Prior Publication Data
US 2021/0016212 A1 Jan. 21, 2021

Related U.S. Application Data

(63) Continuation of application No. 15/437,526, filed on Feb. 21, 2017, now Pat. No. 10,744,431.
(Continued)

(51) Int. Cl.
*B01D 35/16* (2006.01)
*B01D 35/30* (2006.01)
(Continued)

(52) U.S. Cl.
CPC ........... *B01D 35/306* (2013.01); *B01D 27/08* (2013.01); *B01D 29/111* (2013.01); *B01D 29/13* (2013.01);
(Continued)

(58) Field of Classification Search
CPC ...... B01D 35/306; B01D 35/30; B01D 35/16; B01D 29/21; B01D 29/111; B01D 27/08;
(Continued)

(56) References Cited

U.S. PATENT DOCUMENTS 4,842,729 A * 6/1989 Buchan ................. B01F 5/0496
137/268
4,844,270 A 7/1989 Coffman
(Continued)

FOREIGN PATENT DOCUMENTS

CN 103480190 A * 1/2014 ............. B01D 35/16
DE 196 13 847 A1 10/1997
(Continued)

OTHER PUBLICATIONS

International Search Report and Written Opinion for Application No. PCT/US2017/018595 dated Aug. 2, 2017.
(Continued)

*Primary Examiner* — Waqaas Ali
(74) *Attorney, Agent, or Firm* — Merchant & Gould P.C.

(57) ABSTRACT

A filter cartridge includes a threaded sleeve having a seal holder recess and seal member. The filter cartridge is for removably threading onto a filter head that includes threads for connection to the filter cartridge by way of the threaded sleeve. The filter head includes a ramp that engages the seal member to form a seal. The force needed to make the seal is a torque of less than 10 N-m.

16 Claims, 19 Drawing Sheets

Related U.S. Application Data

(60) Provisional application No. 62/302,553, filed on Mar. 2, 2016, provisional application No. 62/352,609, filed on Jun. 21, 2016.

(51) Int. Cl.
    *B01D 29/21*     (2006.01)
    *B01D 29/11*     (2006.01)
    *B01D 27/08*     (2006.01)
    *B01D 29/13*     (2006.01)
    *B01D 35/00*     (2006.01)

(52) U.S. Cl.
CPC ............ *B01D 29/21* (2013.01); *B01D 35/005* (2013.01); *B01D 35/16* (2013.01); *B01D 35/30* (2013.01); *B01D 2201/295* (2013.01); *B01D 2201/303* (2013.01); *B01D 2201/304* (2013.01); *B01D 2201/34* (2013.01); *B01D 2201/347* (2013.01); *B01D 2201/4007* (2013.01); *B01D 2201/4092* (2013.01)

(58) Field of Classification Search
CPC ............. B01D 29/13; B01D 35/005; B01D 2201/347; B01D 2201/303; B01D 2201/4092; B01D 2201/34; B01D 2201/295; B01D 2201/304; B01D 2201/4007; B01D 53/30
See application file for complete search history.

(56) References Cited

U.S. PATENT DOCUMENTS

| | | | |
|---|---|---|---|
| 5,685,985 A | 11/1997 | Brown et al. | |
| 5,770,054 A * | 6/1998 | Ardes | B01D 29/21 210/130 |
| 6,579,448 B2 * | 6/2003 | Dworatzek | B01D 29/21 210/130 |
| 7,556,155 B2 | 7/2009 | Harder et al. | |
| 2005/0058873 A1 | 3/2005 | Arthur et al. | |
| 2013/0153487 A1 * | 6/2013 | Terry | B01D 36/006 210/342 |
| 2015/0090651 A1 | 4/2015 | Kotale et al. | |

FOREIGN PATENT DOCUMENTS

| | | | | |
|---|---|---|---|---|
| EP | 2 664 371 A1 | 11/2013 | | |
| EP | 2664371 A1 * | 11/2013 | ............ | B01D 29/111 |
| JP | 2000153112 A | 6/2000 | | |
| WO | 2009/149186 A1 | 12/2009 | | |

OTHER PUBLICATIONS

Second Office Action for Chinese Patent Application No. 201780023298.X dated Jun. 9, 2021, 16pgs.

* cited by examiner

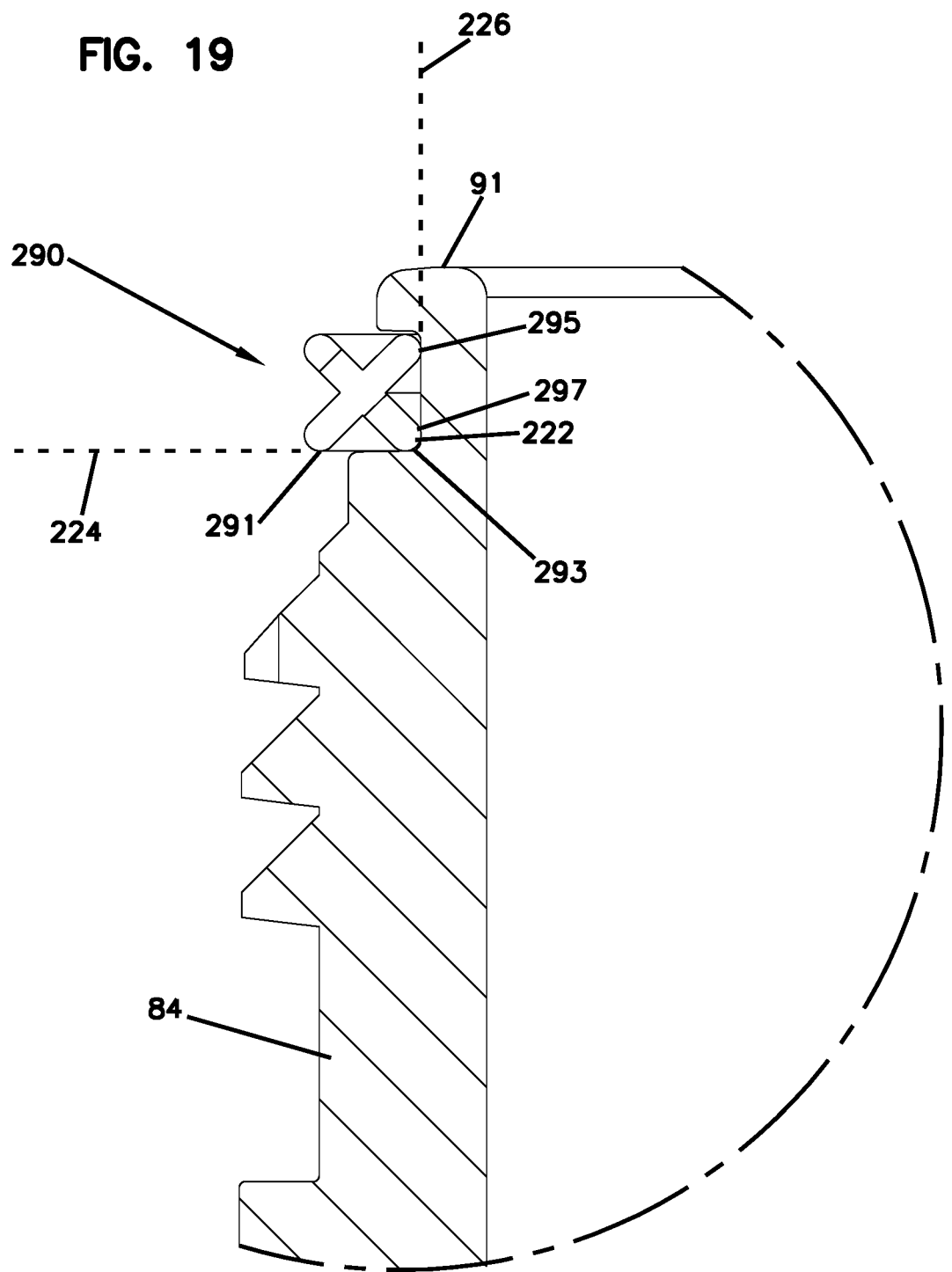

LIQUID FILTER ARRANGEMENT AND METHODS

This application is a continuation of U.S. patent application Ser. No. 15/437,526 filed Feb. 21, 2017, which claims priority under 35 USC § 119(e) to U.S. provisional application 62/302,553 filed Mar. 2, 2016 and U.S. provisional application 62/352,609 filed Jun. 21, 2016; each of these applications is incorporated by reference herein.

TECHNICAL FIELD

This disclosure relates to filter cartridges, filter assemblies including the cartridge connected to a filter head, and methods of use. The filter arrangement in this disclosure can be used for filtration of fluids, such as liquids, especially fuel, hydraulics, and lube.

BACKGROUND

Filters are commonly used in connection with lubrication systems and fuel systems for internal combustion engines and hydraulic systems for heavy duty equipment. Filters are also used in many other types of liquid systems. In these types of systems, the filter is changed periodically. One type of typical filter system used is a spin-on canister filter.

Spin-on canister filters are disposable units, which typically include a single-use housing holding a permanently mounted, non-replaceable filter element (cartridge filter). The canister holding the cartridge filter is usually spun onto a filter head by a threaded engagement. The liquid to be cleaned passes from the filter head and into the housing for filtering. The cleaned liquid exits the housing and reenters the filter head. After some period of use, the spin-on canister filter is removed from the filter head and is discarded. A new spin-on canister filter is then mounted onto the filter head.

Typically, there is some type of seal arrangement between the filter and the filter head. In the past, the seal arrangement could put a drag when installing and removing, which causes difficulty in maintenance. Further, in prior art designs, it takes several revolutions of the housing onto the filter head before the threads bottom out. This can cause difficulty with cross-threading or not properly mounting the filter onto the filter head. Improvements are desirable.

SUMMARY

A filter cartridge and filter assembly are provided to improve the problems of the prior art.

In a first aspect, a filter cartridge is provided including a housing, a filter media construction, a sleeve, and a housing seal member.

The housing has a surrounding wall defining an interior volume. The housing has an open mouth in communication with the interior volume and a bottom opposite of the mouth. The surrounding wall has an interior surface in communication with the interior volume and an opposite exterior surface.

The filter media construction is operably oriented in the interior volume of the housing. The sleeve is oriented against the exterior surface of the surrounding wall. The sleeve has an inner portion and an opposite exterior portion. The inner portion is oriented against the exterior surface of the surrounding wall. The sleeve includes opposite first and second ends, with the first end being adjacent to the open mouth of the housing. The sleeve includes a seal holder recess along the exterior portion. A radially extending base surface is part of the recess. A recess wall extends axially at least partially between the base surface and the first end of the sleeve. The base surface has a radial base length extending from the recess wall. The sleeve includes a plurality of threads projecting radially outwardly from a threaded section of the exterior portion of the sleeve between the second end and the base surface. The threaded section has a radial length measured from the recess wall, wherein the radial length of the threaded section is greater than the radial base length. The housing seal member is operably held in the seal holder recess.

Independent of the above, and in another aspect, a filter cartridge is provided. The filter cartridge includes a housing, a filter media construction, a sleeve, and a housing seal member. The housing has a surrounding wall defining an interior volume. The housing has an open mouth in communication with the interior volume and a bottom opposite of the mouth. The surrounding wall has an interior surface in communication with the interior volume and an opposite exterior surface. The filter media construction is operably oriented in the interior volume of the housing. The sleeve is against the exterior surface of the surrounding wall. The sleeve has an inner portion and an opposite exterior portion, with the inner portion being oriented against the exterior surface of the surrounding wall. The sleeve includes opposite first and second ends, the first end being adjacent the open mouth of the housing. The sleeve includes a seal holder recess along the exterior portion. The recess includes a radially extending base surface and a recess wall extending axially at least partially between the base surface and the first end of the sleeve. The seal holder recess has a joint at an intersection between the base surface and the recess wall. The sleeve includes a threaded section in the exterior portion of the sleeve between the second end and the base surface. The housing seal member is operably held in the seal holder recess. The housing seal member has a sealing compression region. The sealing compression region in cross-section is defined by a compression region line. A line perpendicular to the compression region line passes through the joint in the seal holder recess and the seal member.

Independent of the above, a filter cartridge is provided comprising a housing having a surrounding wall defining an interior volume; the housing having an open mouth in communication with the interior volume and a bottom opposite of the mouth; the surrounding wall having an interior surface in communication with the interior volume and an opposite exterior surface. A filter media construction is operably oriented in the interior volume of the housing; and a sleeve is against the exterior surface of the surrounding wall. The sleeve has an inner portion and an opposite exterior portion. The inner portion is oriented against the exterior surface of the surrounding wall. The sleeve includes, opposite first and second ends, with the first end being adjacent the open mouth of the housing; a seal holder recess along the exterior portion and a housing seal member being held in the seal holder recess; a joint being defined at an intersection between a line tangent to a lowest point of the seal member, when the cartridge is oriented with the mouth as uppermost, and a line tangent to a most radially inward portion of the seal member; a threaded section in the exterior portion of the sleeve between the second end and the base surface. The housing seal member has a sealing compression region; the sealing compression region in cross-section is defined by a compression region line. A line perpendicular to the compression region line passes through the joint and the housing seal member.

Independent of the above, the seal holder recess may be defined by an outwardly radially projecting rib adjacent to the first end of the sleeve forming a ceiling of the recess, wherein the seal holder recess includes radially extending base surface and a recess wall extending axially between the base surface and the ceiling.

In aspects that include a rib, the rib can be even with the first end of the sleeve.

In aspects that include a rib, the rib can be spaced from the first end of the sleeve.

In aspects that include a rib, the rib can be part of the sleeve.

In aspects that include a rib, the rib can be part of the housing.

In aspects that include a rib, the rib can be part of both the sleeve and the housing.

In aspects that include a rib, the outwardly radially projecting rib can have a length less than 80% of the radial base length.

In aspects that include a rib, the outwardly radially projecting rib can have a length less than 60% of the radial base length.

In aspects that include a rib, the outwardly radially projecting rib can have a length less than 55% of the radial base length.

The rib can extend radially away from the recess wall a distance less than the base surface extends away from the recess wall.

The base surface is located at least 4 mm and no greater than 15 mm from an axial rim defining the mouth of the housing.

The base surface can be located at least 7 mm and no greater than 11 mm from an axial rim defining the mouth of the housing.

The sleeve can include a bevel surface between the base surface and the threaded section, the bevel surface being angled relative to the threaded section at an angle between 10-50 degrees.

The sleeve can include a bevel surface between the base surface and the threaded section, with the bevel surface being angled relative to the threaded section at an angle between 12-30 degrees.

The sleeve can include a bevel surface between the base surface and the threaded section, the bevel section being angled relative to the threaded section at an angle between 13-17 degrees.

The bevel surface can have an axial length between the base surface and the threaded section of 0.7-2 mm.

The bevel surface can have an axial length between the base surface and the threaded section of 0.8-1.5 mm.

The sleeve can include a radially extending stop member between the threaded section and the second end.

The stop member is located at least 17 mm and no greater than 30 mm from an axial rim defining the mouth of the housing.

The stop member is located at least 18 mm and no greater than 28 mm from an axial rim defining the mouth of the housing.

The stop member projects radially outwardly a distance greater than any other portion of the sleeve.

The filter media construction comprises a cylinder of pleated filter media secured between first and second end caps.

A ring may project axially from the first end cap in a direction away from a remaining part of the filter media construction, and the first end cap seal member can be held by the ring.

The first end cap seal member may project radially outwardly from the ring.

The filter media construction may be fixed and non-removably mounted in the interior volume of the housing.

The housing bottom can include a drain valve.

The housing seal member may project radially outwardly farther than the rib.

The wall of the housing may overlap the first end of the sleeve.

The wall of the housing may overlap the projecting rib and be in extension along the exterior portion of the sleeve along the recess wall.

In another aspect, a filter assembly is provided including a filter cartridge as variously characterized above and further including a filter head removably attached to the filter cartridge.

The filter head can include an outer wall surrounding a cartridge-receiving interior. The outer wall has an end rim, a threaded region oriented toward the cartridge-receiving interior adjacent to the end rim, and a ramp. The ramp may be angled in a direction toward the cartridge receiving interior and positioned to engage the housing seal member to form a seal with the filter cartridge when the filter head and filter cartridge are operably attached to each other.

The threaded region can be between the ramp and the end rim.

The ramp can be angled between 5 and 45 degrees from the outer wall of the filter head.

The ramp can be angled between 10 and 30 degrees from the outer wall of the filter head.

The ramp can be angled between 12 and 18 degrees from the outer wall of the filter head.

The filter head may include an inlet arrangement for conveying unfiltered fluid to the filter cartridge in an outlet arrangement for conveying filtered fluid from the filter cartridge.

Independent of the above, in another aspect, a filter assembly is provided. The filter assembly includes a filter head having an inlet arrangement, an outlet arrangement, and an outer wall surrounding a cartridge-receiving interior. The outer wall has an end rim, a threaded region oriented toward the cartridge-receiving interior adjacent to the end rim, and a ramp. A filter cartridge is removably attached to the filter head. The filter cartridge includes a housing, a filter media construction operably oriented in an interior volume of the housing, and a sleeve surrounding and against the housing. The sleeve has a threaded section mateably engaging the threaded region of the filter head. The sleeve defines a seal holder recess. A seal member is within the seal holder recess and projects radially outwardly. The ramp on the filter head is compressed against the seal member to form a seal between the filter head and the filter cartridge.

The ramp can be angled between 5 and 45 degrees from the outer wall of the filter head.

The ramp can be angled between 10 and 30 degrees from the outer wall of the filter head.

The ramp can be angled between 12 and 18 degrees from the outer wall of the filter head.

The sleeve has an inner portion and an opposite exterior portion. The inner portion can be oriented against the exterior surface of the housing. The sleeve includes opposite first and second ends, with the first end being adjacent an open mouth of the housing. The seal holder recess is along the exterior portion, the recess including a radially extending base surface and a recess wall extending axially at least partially between the base surface and the first end of the sleeve. The seal holder recess has a joint being defined at an intersection between a line tangent to a lowest point of the seal member, when the cartridge is oriented with the mouth as uppermost, and a line tangent to a most radially inward portion of the seal member. The threaded section of the sleeve is in the exterior portion of the sleeve between the second end and the base surface. The ramp compresses against the housing seal member in cross-section along a compression region line. A line perpendicular to the compression region line passes through the joint in the seal holder recess and the seal member.

The sleeve may include a bevel surface between the base surface and the threaded section. The bevel section can be angled relative to the threaded section at an angle between 10-50 degrees.

The sleeve can include a bevel surface between the base surface and the threaded section, with the bevel surface being angled relative to the threaded section at an angle between 12-30 degrees.

The sleeve can include a bevel surface between the base surface and the threaded section, with the bevel surface being angled relative to the threaded section at an angle between 13-17 degrees.

The bevel surface has an axial length between the base surface and the threaded section of 0.7-2 mm.

The bevel section can have an axial length between the base surface and the threaded section of 0.8-1.5 mm.

The sleeve can include a radially extending stop member between the threaded section and the second end.

The stop member can be located at least 17 mm and no greater than 30 mm from an axial rim defining a mouth of the housing.

The stop member can be located at least 18 mm and no greater than 28 mm from an axial rim defining a mouth of the housing.

The stop member may project radially outwardly a distance greater than any other portion of the sleeve.

The filter media construction may comprise a cylinder of pleated filter media secured between first and second end caps.

A ring can project from the first end cap in a direction away from a remaining part of the filter media construction, and a first end cap seal member can be held by the ring.

The first end cap seal member may project radially outwardly from the ring.

The filter media construction is fixed and non-removably mounted in the interior volume of the housing.

The filter cartridge may further include a drain valve.

Independent of the above, and another aspect, a method of installing a filter cartridge on a filter head is provided. The method includes steps of providing a filter head, providing a filter cartridge, and threadably mating the filter head and filter cartridge. The step of providing a filter head includes a providing a head having an inlet arrangement, and outlet arrangement, and an outer wall surrounding a cartridge-receiving interior. The outer wall has an end rim and a threaded region oriented toward the cartridge-receiving interior adjacent to the end rim. The step of providing a filter cartridge includes providing a housing, a filter media construction operably oriented in an interior volume of the housing, and a sleeve surrounding and against the housing. The sleeve has a threaded section, defines a seal holder recess, and a seal member that is within the seal holder recess and projecting radially outwardly. The step of threadably mating includes mating the threaded section of the sleeve with the threaded region of the filter head to compress the seal member and form a seal between the filter head and the filter cartridge, the seal being formed using a torque less than 50% needed to form an operable seal using a comparable filter head that has a straight section instead of a ramp.

The step of threadably mating may include forming the seal using a torque less than 55% needed to form an operable seal using a comparable filter head that has a straight section instead of a ramp.

The step of threadably mating may include forming the seal using a torque of no greater than 15 N-m.

The step of providing a filter head may include providing the filter head outer wall to have a ramp, wherein the threaded region is between the ramp and the end rim. The step of threadably mating may include compressing the ramp against the seal member to form the seal between and against the ramp and the sleeve.

The step of providing a filter head may include providing the filter head outer wall to have the ramp be angled between 12 and 18 degrees from the outer wall of the filter head.

After the step of threadably mating, there can be a step of disconnecting the filter cartridge and filter head by using a torque of less than 50% needed to disconnect using a comparable filter head that has a straight section instead of a ramp.

After the step of threadably mating, there can be a step of disconnecting the filter cartridge and filter head by using a torque of less than 65% needed to disconnect using a comparable filter head that has a straight section instead of a ramp.

After the step of threadably mating, there can be a step of disconnecting the filter cartridge and filter head by using a torque of less than 15 N-m.

The step of providing a filter cartridge can include providing a filter cartridge as variously characterized in any of the above characterizations.

The step of providing a filter head can include providing a filter head according to the various characterizations above.

It is noted that not all of the specific features described herein need to be incorporated in an arrangement for the arrangement to have some selected advantage according to the present disclosure.

BRIEF DESCRIPTION OF THE DRAWINGS

FIG. 19 is an enlarged cross-sectional view, similar to FIG. 10, but without the filter head shown and depicting another embodiment.

DETAILED DESCRIPTION

A filter cartridge and a filter assembly that improve the problems of the prior art is shown in FIGS. 1-4.

Figure 1:
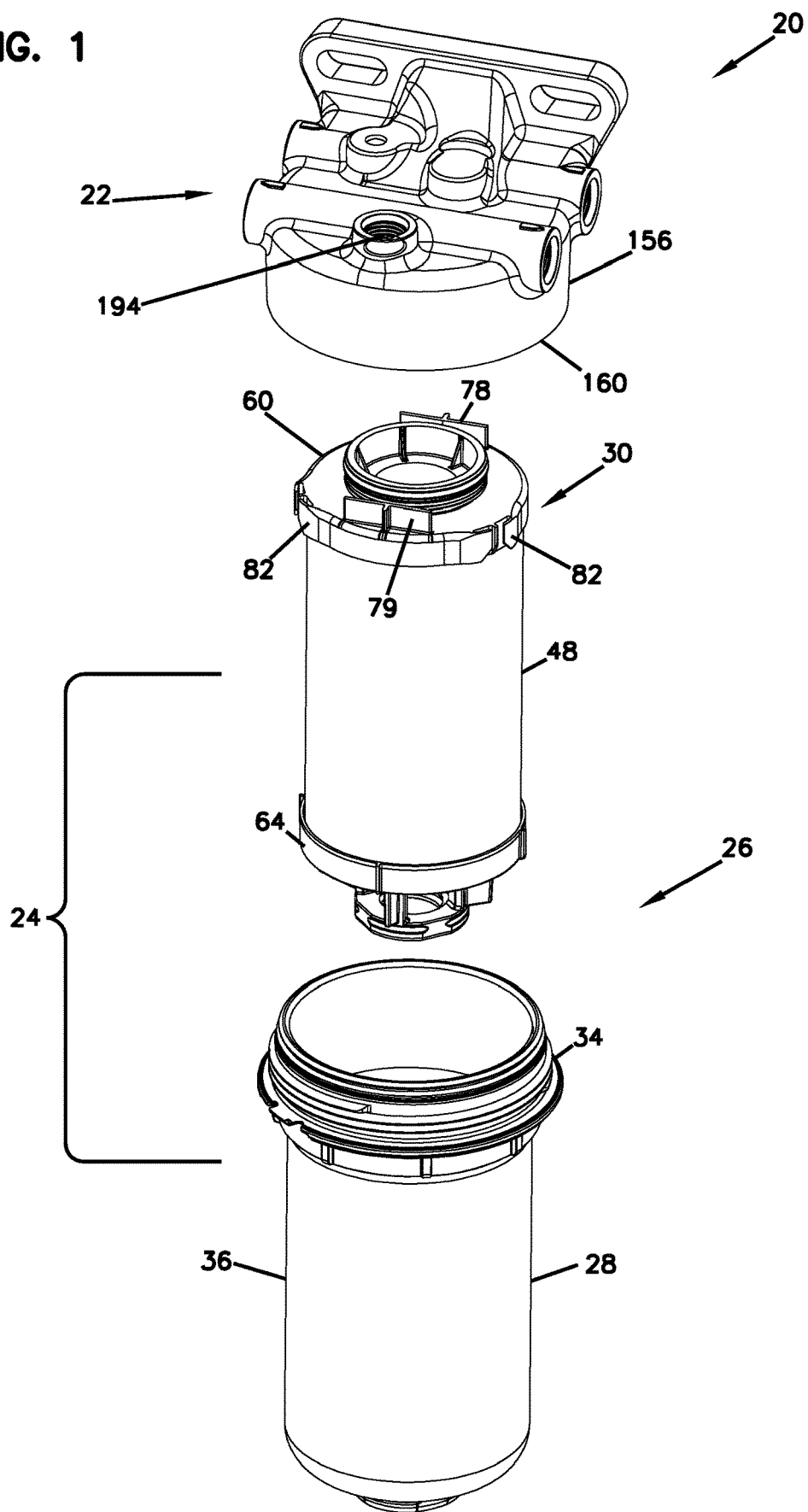
FIG. 1 is an exploded, top perspective view of a filter assembly constructed in accordance with the principles of this disclosure.
Figure 2:
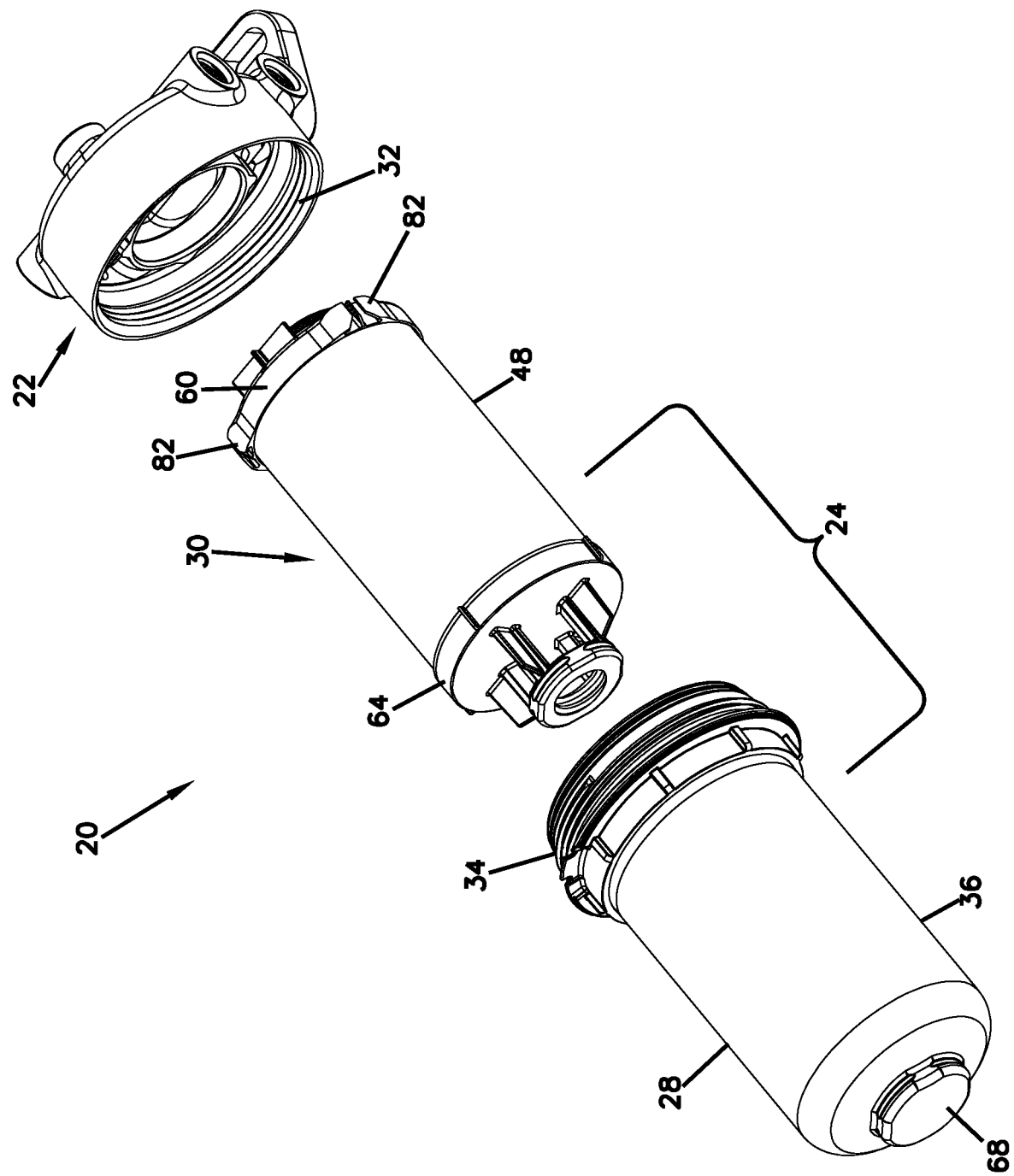
FIG. 2 is an exploded, bottom perspective view of the filter assembly of FIG. 1.
Figure 3:
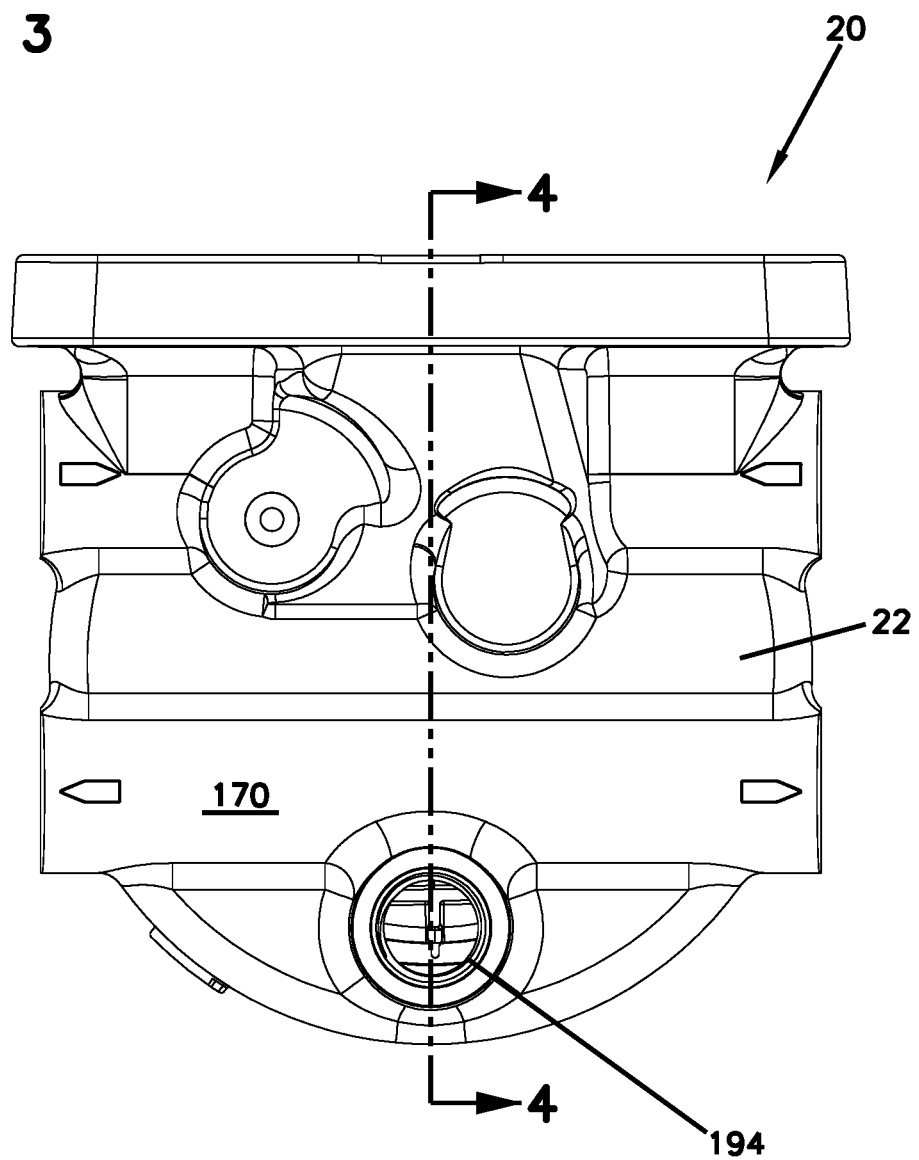
FIG. 3 is a top view of the assembled filter assembly of FIGS. 1 and 2.

The filter assembly constructed in accordance with the principles of this disclosure is illustrated in exploded perspective view in FIGS. 1 and 2 at 20. The filter assembly 20 includes a filter head 22. The filter head 22 will be mounted or connected to a system, such as equipment with a lubrication system or fuel system for internal combustion engines, or a hydraulic system for heavy duty equipment. The filter head 22 will be in liquid communication with components of this equipment such that the liquid to be filtered will flow into the filter head 22 for filtering by the filter assembly 20 and then exit the filter head 22 in a filtered state for use by the equipment.

The filter assembly 20 further includes a filter cartridge 24. The filter cartridge 24, in this embodiment, is a spin-on canister filter 26. The spin-on canister filter 26 has a single use can or housing 28 holding a permanently mounted, non-replaceable filter element 30. The housing 28 holding the filter element 30 is spun onto the filter head 22 by a threaded engagement. As can be seen in FIG. 22, the filter head 22 has threads 32, and the housing 28 has threads 34. The liquid to be cleaned passes from the filter head 22 and into the housing 28 for filtering. The liquid flows through the filter element 30 for filtering, reenters the filter head 22, and then exits the filter head 22 to be used by downstream equipment. After some period of use, the filter cartridge 24 is removed from the filter head 22 and is discarded. A new filter cartridge 24 may then be provided and mounted onto the filter head 22 for filtering. In alternate embodiments, the filter assembly 20 could be a bowl-cartridge filter, in which the housing forms a re-usable bowl that connects to the filter head, and a replaceable filter cartridge is held within the bowl.

Figure 5:
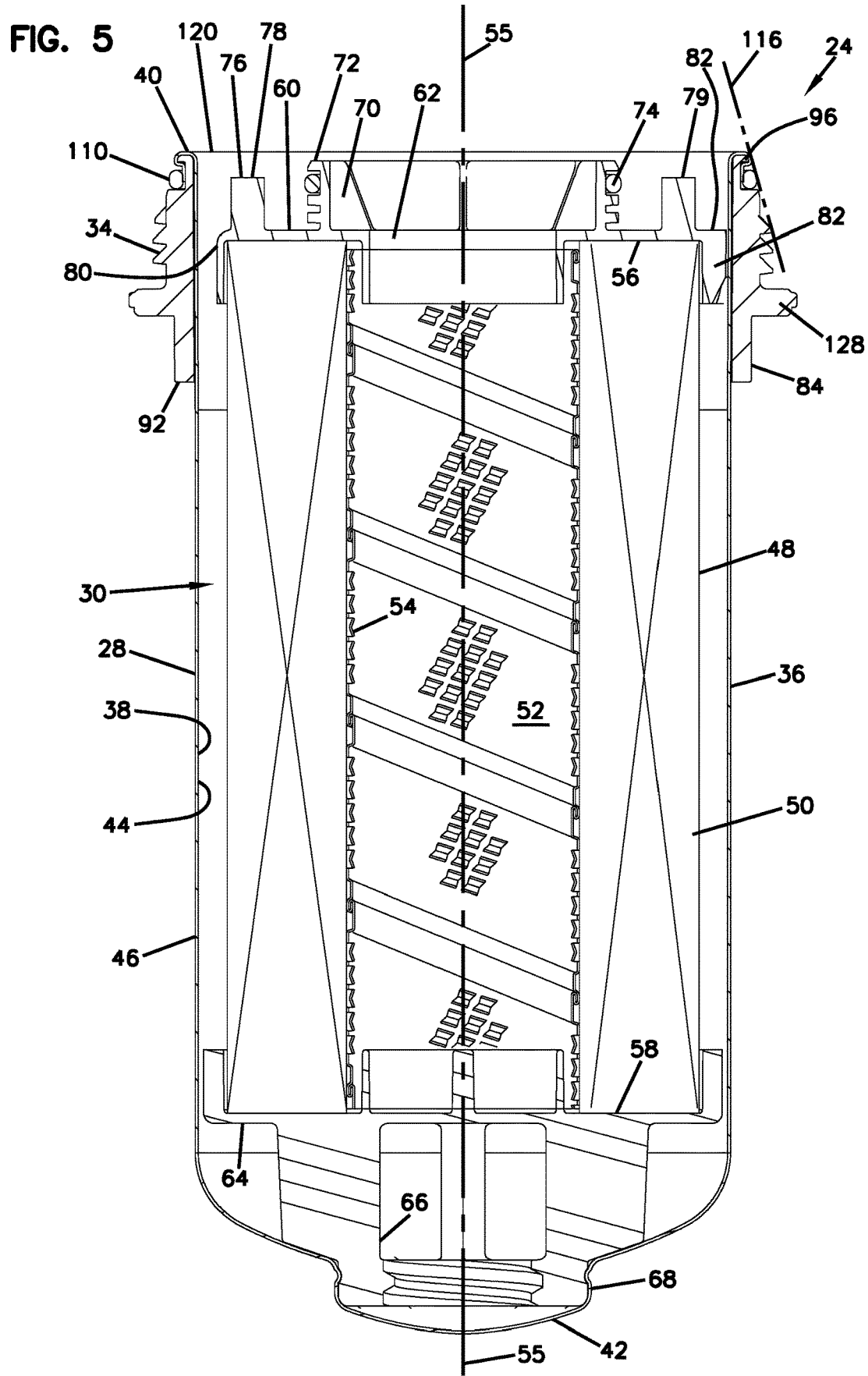
FIG. 5 is a cross-sectional view of the filter cartridge used in the filter assembly of FIGS. 3 and 4.

Attention is directed to FIG. 5. FIG. 5 is a cross-sectional view of filter cartridge 24. As mentioned previously, the filter cartridge 24 includes the housing 28 holding the non-removable filter element 30.

The filter housing 28 includes a surrounding wall 36. The housing wall 36 will typically be a thin-walled construction of metal. The surrounding wall 36 of the housing 28 defines an interior volume 38. The housing 28 has an open mouth 40. The open mouth 40 is in communication with the interior volume 38.

The housing 28 includes a housing bottom 42. The bottom 42 is at an end of the housing 28 opposite of the mouth 40. The surrounding wall 36 has an interior surface 44. The interior surface 44 is in communication with the interior volume 38. On an opposite side of the wall 36 from the interior surface 44 is an exterior surface 46. A central, longitudinal axis 55 passes through the cartridge 24 as it extends through the open mouth 40 and housing bottom 42.

The filter element 30 is permanently and non-removably mounted in the interior volume 38 of the housing 28. The filter element 30 includes a filter media construction 48. The filter media construction 48 is operably orientated in the interior volume 38 of the housing 28. The filter media construction 48 may be embodied in many different forms. In many embodiments, the filter media construction 48 includes pleated media 50. The pleated media 50 may be cellulose, glass, synthetic, or a blend of any of these. The filter media construction 48 may include fine fiber.

In many embodiments, the filter media construction 48 is generally tubular, which can include oval or cylindrical in shape. In this embodiment, it is cylindrical in shape such that the pleated media 50 defines an open filter interior 52. The filter media construction 48, including if it is pleated media 50, may be supported by an inner support, such as a perforated inner liner 54. The inner liner 54 supports the pleats and prevents the pleats in the pleated media 50 from collapsing.

The filter media construction 48 has opposite ends 56, which is adjacent the open mouth 40, and 58, which is adjacent the bottom 42. Secured to the media construction 48 at the end 56 is a first end cap 60. The first end cap 60 is an open end cap because it has an opening 62 in its center that is in communication with the open filter interior 52. The first end cap 60 can be made from various types of material, including non-metal, such as nylon or hard plastic. The first end cap 60 is secured to the filter media construction 48 by either molding the first end cap 60 directly to the filter media construction 48 or by other methods such as adhesive or potting material.

A second end cap 64 is secured to the end 58 of the filter media construction 48. The second end cap 64 will typically be made of the same materials as the first end cap 60, which can be nylon or hard plastic. The second end cap 64 may be closed to the open filter interior 52, but in some embodiments, it can be selectively opened by use of a drain valve, not shown in FIG. 5. A mounting arrangement 66 for the drain valve can been seen in FIG. 5 as part of the second end cap 64. The housing 28 can be opened at access opening 68, which may then allow the drain valve to drain fluid from the filter cartridge 24.

Referring again to the first end cap 60, there is a ring 70 that projects axially from the first end cap 60 in a direction away from the second cap 64 and away from a remaining part of the filter media construction 48. The ring 70, in this embodiment, is adjacent to the opening 62 of the first end cap 60. The ring 70 defines a groove 72. The groove 72 opens in a radially outward direction, toward the interior surface 44 of the surrounding wall 36. Located within the groove 72 is first end cap seal member 74. The first end cap seal 74 may be embodied as an O-ring. The first end cap seal member 74 is oriented in a direction radially outwardly from the ring 70 and toward the interior surface 44 of the surrounding wall 36. It forms a seal 165 with the filter head 22, as described further below in connection with FIGS. 8 and 4.

While many embodiments are possible, in this embodiment, the first end cap 60 includes an optional centering arrangement 76. The center arrangement 76 includes a pair of axial projections 78, 79 that project axially from the first end cap 60 in a direction away from the second end cap 64 and a remaining portion of the filter media construction 48. The center arrangement 76 helps to guide and mount the filter cartridge 24 to the filter head 22. The axial projections 78, 79 are spaced from the projecting ring 70 and are located adjacent to outer radial edge 80 of the first end cap 60.

The first end cap 60 further includes a plurality of outer radial projections 82 (FIGS. 1 and 5). The outer radial projections 82 help to center the filter media construction 48 within the housing 28 by pressing radially against the interior surface 44 of the housing wall 46.

The filter cartridge 24 further includes a sleeve 84. The sleeve 84 will be secured to the housing 28 along the exterior surface 46 of the housing 28. In many embodiments, the sleeve 84 is mounted against the exterior surface 46 of the surrounding wall 36.

Figure 6:
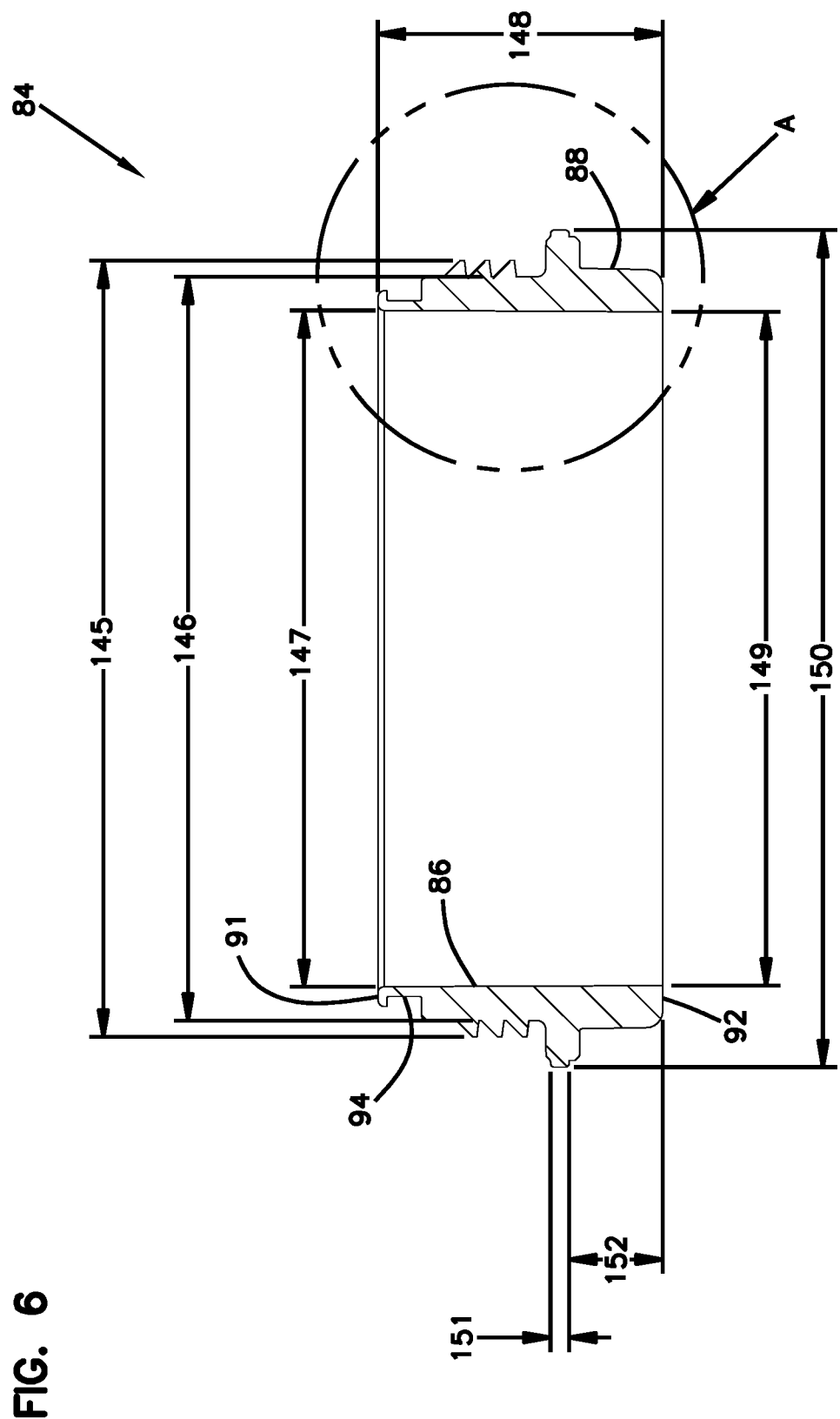
FIG. 6 is a cross-sectional view of the sleeve used with the filter cartridge of FIG. 5.

An enlarged view of the sleeve 84 is illustrated in detail in FIG. 6. The sleeve 84 has an inner portion 86 and an opposite exterior portion 88. The inner portion 86, in the embodiment shown, is orientated against the exterior surface 46 of the surrounding wall 36.

The sleeve 84 can be made from many different types of materials, including metal or non-metal. In preferred embodiments, the sleeve is made from non-metal, such as plastic, for example, nylon.

In reference to FIG. 6, the sleeve 84 has opposite first and second ends 91, 92. The first end 91 is adjacent the open mouth 40 (FIG. 5) of the housing 28. The second end 92 is located spaced from the open mouth 40 and typically in the upper one-third of the housing 28, when the open mouth 40 is orientated to be at the top.

The sleeve 84 includes a seal holder recess 94. The seal holder recess 94 is along the exterior portion 88. As such, the sleeve 84 is a connecting and sealing portion 84.

Figure 7:
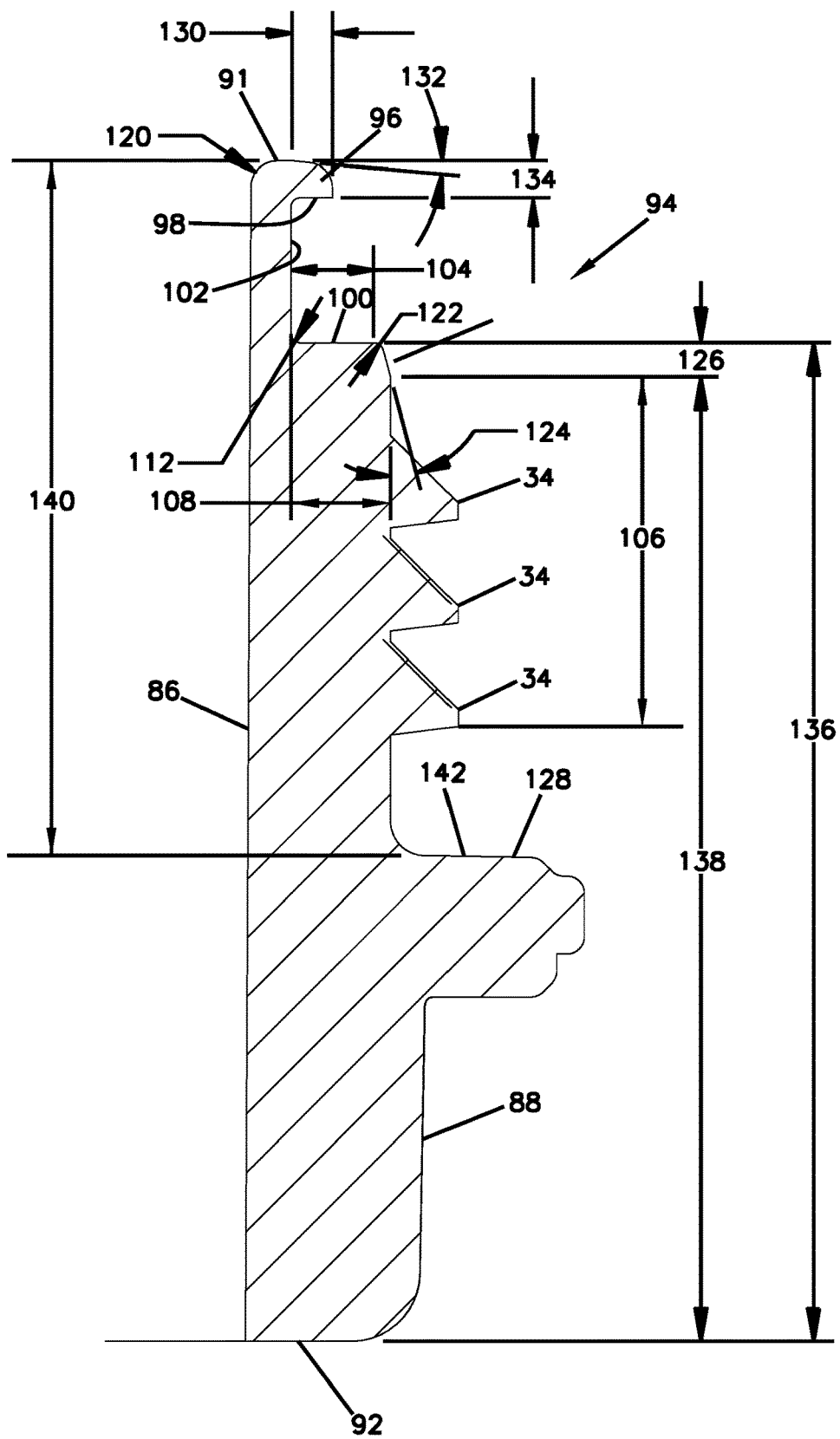
FIG. 7 is an enlarged, cross-sectional view of Section A of FIG. 6.

FIG. 7 shows an enlarged view of one cross-sectional view portion of the sleeve 84, the section shown at Section A in FIG. 6. The sleeve 84 has an outwardly radially projecting rib 96. The rib 96 is adjacent the first end 91 and forms a ceiling 98 of the recess 94. By "adjacent the first end 91" it is meant that the rib 96 can be either be even with the first end 91 or spaced from (either toward or away) a remaining portion of the sleeve 84 by a few mm, e.g., 5 mm or fewer. In FIG. 7, the rib 96 is even with the first end 91. See FIG. 14 for one example embodiment (of many possibilities) in which the rib 96 is adjacent the first end 91 by being spaced from the first end 91. A radially extending base surface 100 is opposite of the ceiling 98 forming a floor of the recess 94. A recess wall 102 extends axially between the ceiling 98 and the base surface 100. The base surface 100 has a radial base length 104 extending from the recess wall 102. Advantages including sealing at a lower torque are achieved when the rib 96 extends a radial distance from recess wall 102 less than the base surface 100 extends away from the recess wall 102.

The housing threads 34 project radially outwardly from threaded section 106 of the exterior portion 88 of the sleeve 84 between the second end 92 and the base surface 100. The threaded section 106 has a radial length 108 measured from the recess wall 102 to the exterior portion 88 from where the individual threads 34 start to project from the exterior portion 88. The radial length 108 of the threaded section 106 is greater than the radial base length 104. This arrangement helps to contribute to a filter cartridge 24 that is easier to mount to the filter head 22 than prior art arrangements, requiring much less torque.

Figure 4:
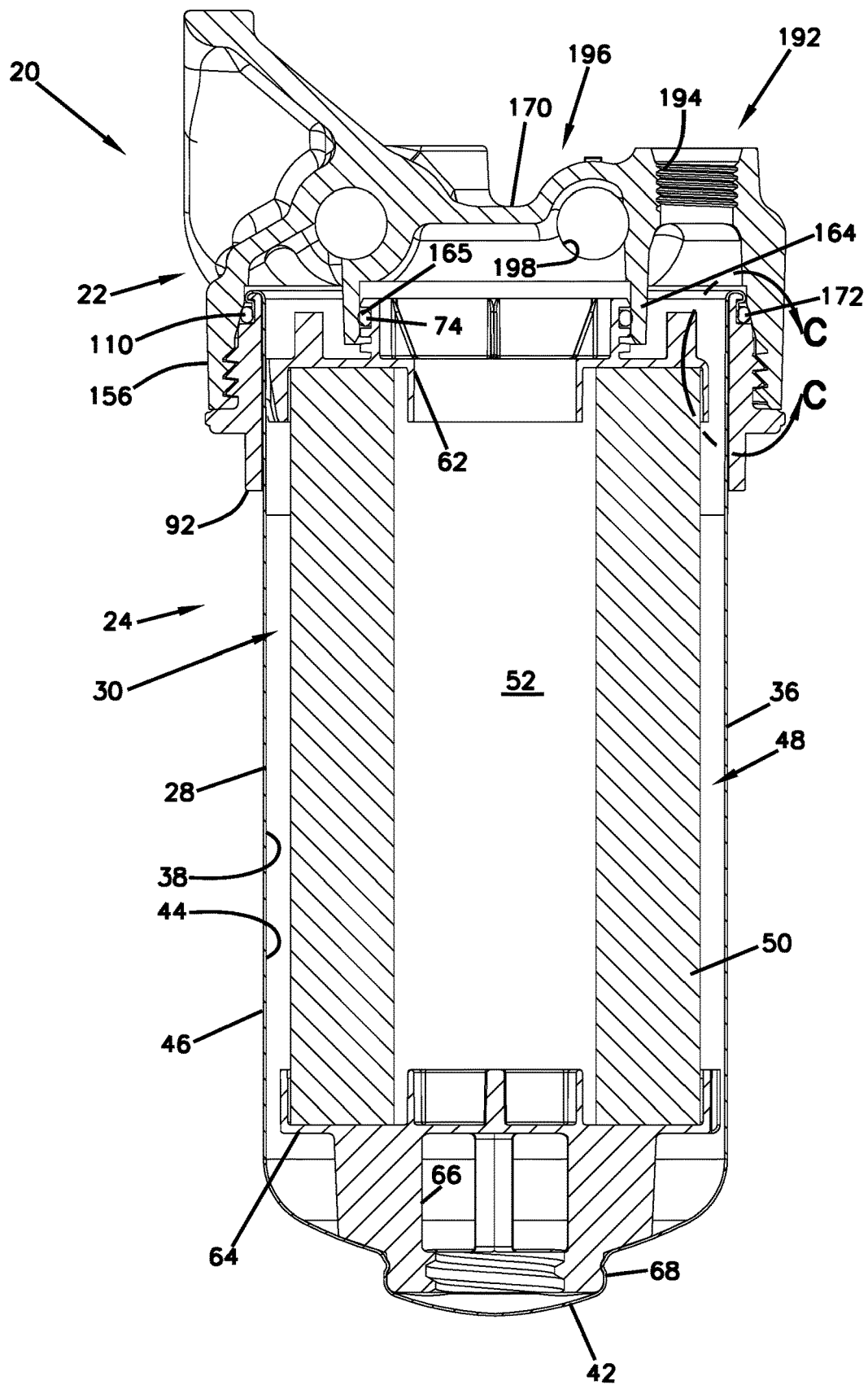
FIG. 4 is a cross-sectional view of the filter assembly of FIG. 3, the cross-section being taken along the line 4-4 of FIG. 3.
Figure 10:
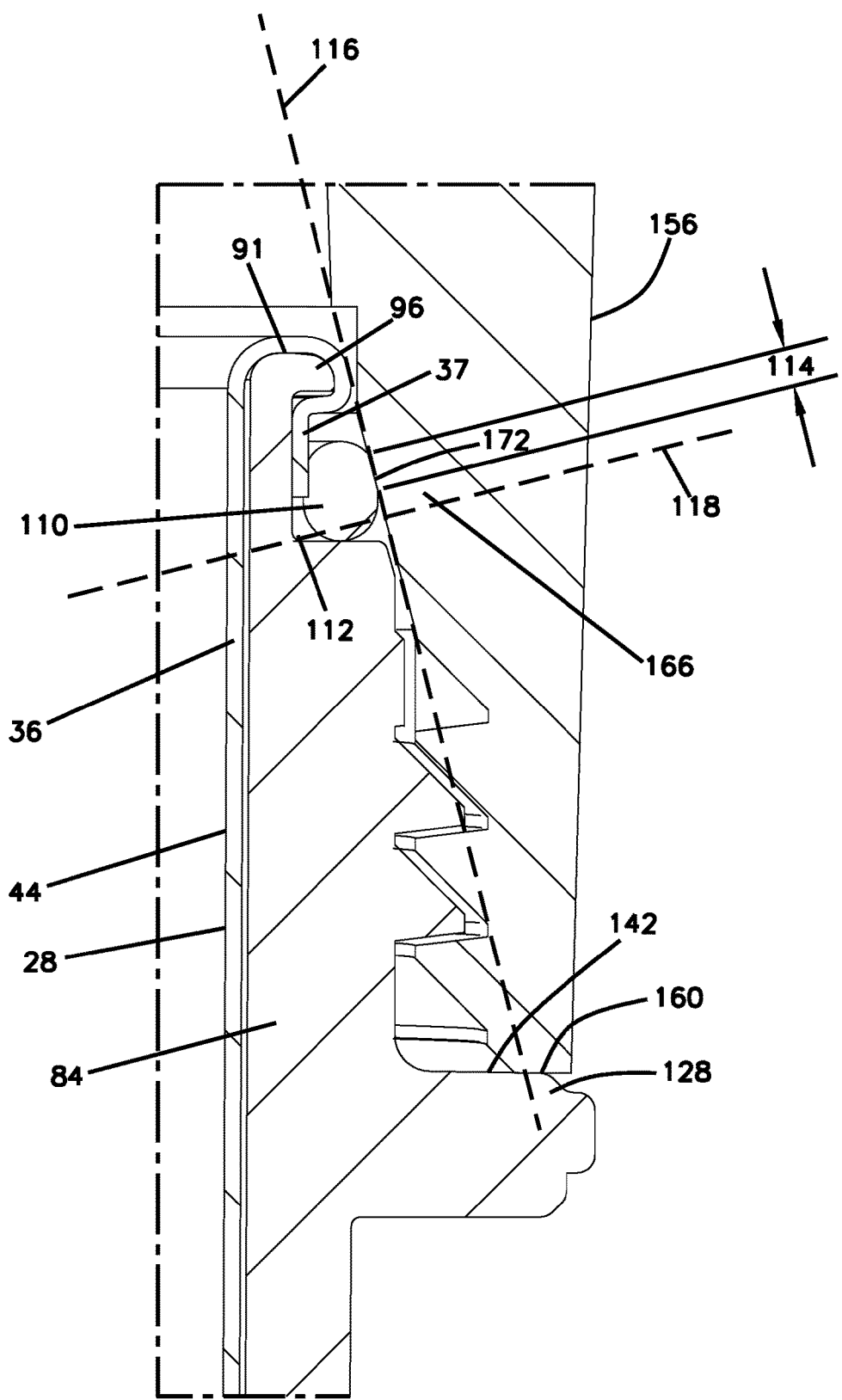
FIG. 10 is an enlarged view of Section C-C of FIG. 4.

In reference to FIGS. 4 and 10, a housing seal member 110 is operably held in the seal holder recess 94. The housing seal member 110 forms a radially outwardly directed seal 172 with the filter head 22, when the filter cartridge 24 is operably connected to the filter head 22. As will be explained below, the housing wall 36 can optionally include a section 37 (FIG. 10) that extends into and line at least a portion of the recess 94, such that the seal 172 is formed between and against the filter head 22, the sleeve 84, and the section 37 of the housing wall 36 extending into the recess 94.

Again in reference to FIG. 7, the seal holder recess 94 includes a joint 112 at an intersection between the base surface 100 and the recess 102. The joint 112 need not be a 90 degree corner, but can be on a radius. For example, the joint 112 can be on a radius 0.25 inches. Many embodiments are possible. The radius can be larger or smaller, and the angle between the base surface 100 and recess 102 can be larger or smaller.

As mentioned previously, there is a housing seal member 110 that is operably held in the seal holder recess 94. Attention is directed to FIG. 10 which shows the housing seal member 110 held within the recess 94 and forming seal 172 with the filter head 22. As can be appreciated from the drawings shown in FIG. 10, the housing seal member 110 has sealing compression region 114, which is a portion of the housing sealing member 110 that receives the compressive force to form the seal 172 with the filter head 22. In this embodiment, the sealing compression region 114, when viewed in cross-section, such as shown in FIG. 10, is defined by a compression region line 116. The compression region line 116 is viewable in FIG. 10 and in FIG. 5. A line 118 (FIG. 10) perpendicular to the compression region line 116 passes through the joint 112 in the seal holder recess 94 and the sealing member 110. In this embodiment, "passing through the sealing member 110" means extending through more than one point of the sealing member 110; that is, if the line 118 is only tangent (a line that touches a curved surface but does not intersect it) to the sealing member 110, it would not pass through the sealing member 110 according to this definition. In general, in this example, the line 118 will not be perpendicular to the central axis 55 (FIG. 5), and the line 116 will not be parallel to the central axis 55.

The arrangement is formed to achieve advantages, including a torque that is less than needed in the prior art to reliably secure the filter cartridge 24 to the filter head 22. Some preferred arrangements are described herein that lead to this result. For example, in FIG. 7, the outwardly radially projecting rib 96 has a radially projecting length that is less than 80% of the length of the radial base line 104. The many embodiments, the length of the rib 96 is less than 60% of the radial base length 104. In even more preferred embodiments, the rib 96 has a length of less than 55 percent of the radial base length 104.

Further arrangements that lead to advantage include the base surface 100 being located at 4 mm and no greater than 15 mm from an axial rim 120 (FIG. 5) defining the mouth 40 of the housing 28. In more preferred embodiments, the base surface 100 is located at least 7 mm and no greater than 11 mm, preferably about 9 mm, from the axial rim 120 of the mouth 40 of the housing 28.

Other arrangements that lead to advantage include the sleeve 84 having a beveled surface 122 (FIG. 7). The beveled surface 122 is between the base surface 100 and the threaded section 106. Advantages result by having the beveled surface 122 being angled relative to the threaded section 106 at an angle 124 between 13-17 degrees.

The beveled surface 122 can have an axial length 126 between the base surface 100 and the threaded section 106 of 0.7-2 mm. In more preferred embodiments, the beveled surface 122 can have the axial length 126 between the base surface 100 and the threaded section 106 of 0.8-1.5 mm.

In FIG. 7, it can be seen how in the particular embodiment illustrated, the sleeve 84 includes a radially extending stop member 128. The stop 128 is between the threaded section 106 and the second end 92 of the sleeve 84. The stop member 128 can be located at least 17 mm and no greater than 30 mm from the axial rim 120 (FIG. 5) defining the mouth 40 of the housing 28. In embodiments that lead to more preferred advantages, the stop member 128 is located at least 18 mm and no greater than 28 mm, preferably about 26 mm, from the axial rim 120 defining the mouth 40 of the housing 28. In still further arrangements leading to advantages, the stop member 128 projects radially outwardly a distance that is greater than any other portion of the sleeve 84. This can be seen in the particular arrangement shown in FIG. 7.

In reference again to FIG. 5, the housing seal member 110 projects radially outwardly further than the rib 96. This can lead to advantage of forming a seal with a filter head with less torque than prior art arrangements.

In reference now to FIGS. 5 and 10, in many preferred arrangements, the wall 36 of the housing 28 overlaps the first end 91 of the sleeve 84 at section 37, as previously mentioned. For example, the wall 36 of the housing 28 can overlap the projecting rib 96 and be an extension at section 37 along the exterior portion 88 of the sleeve 84 along the recess wall 102 (FIG. 7). In the example illustrated in FIG. 10, the wall 36 of the housing 28 extends over the first end 91 of the sleeve 84, around the rib 96, along the ceiling 98 (FIG. 7), and along at least a portion of the recess wall 102 (FIG. 7). In FIG. 10, the section 37 of the wall 36 stops short of extending all the way along the recess wall 102 to the base surface 100 (FIG. 7), but in other embodiments, it could extend the full extension of the recess wall 102 to the base surface 100 and further extend along the base surface 100.

FIG. 7 illustrates one example useful embodiment with dimensions that provide a workable design leading to advantage. Advantages include those that improve the prior art such as having the ability to mount the filter cartridge 24 on the filter head 22 using torque smaller than the prior art, as well as, providing the seal with only a few revolutions and thereby avoiding the difficulty caused with possible cross-threading. In FIG. 7, the rib 96 is shown projecting from the recess wall 102 at a dimension 130. The dimension 130 can be at least 2 mm, not more than 5 mm, and preferably about 4 mm. The angle 132 that the rib 96 declines as it extends from the inner portion 86 in a direction toward the exterior portion 88 is at least 3 degrees, no greater than 7 degrees, and preferably about 5 degrees. The rib 96 has an axial length 134 from the first end 91 to the recess wall 102 of at least 2 mm, not more than 6 mm, and preferably 3-5 mm. The length 136 from the second end 92 to the base surface 100 is at least 20 mm, no greater than 35 mm, and preferably 25-30 mm. The length 138 from the second end 92 to the upper end of the threaded section 106 and the start of the bevel surface 122 is at least 20 mm, no greater than 30 mm, and preferably 27-29 mm, such as about 28 mm. The distance 140 between the first end 91 and an upper surface 142 of the stop member 128 is at least 10 mm, no greater than 30 mm, preferably 18-28 mm. The upper surface 142 of the stop member 128 is the portion of the stop member 128 that is oriented toward the first end 91.

FIG. 6 illustrates a cross-section of the sleeve 84 by itself and unattached to a remaining portion of the filter cartridge 24. FIG. 6 shows useful dimensions for embodiments that result in advantages over the prior art. Some of these dimensions are summarized in the table below.

| Dimension | At least (mm) | No greater than (mm) | Preferably (mm) |
|---|---|---|---|
| 145 | 80 | 120 | 90-95, about 93 |
| 146 | 75 | 115 | 87-92, about 89 |
| 147 | 65 | 105 | 78-83, about 81 |
| 148 | 25 | 40 | 33-36, about 34 |
| 149 | 64 | 104 | 77-82, about 81 |
| 150 | 85 | 125 | 98-103, about 101 |
| 151 | 1.5 | 3.0 | 2.0-2.5, about 2.2 |
| 152 | 6 | 15 | 9-12, about 11 |

Figure 8:
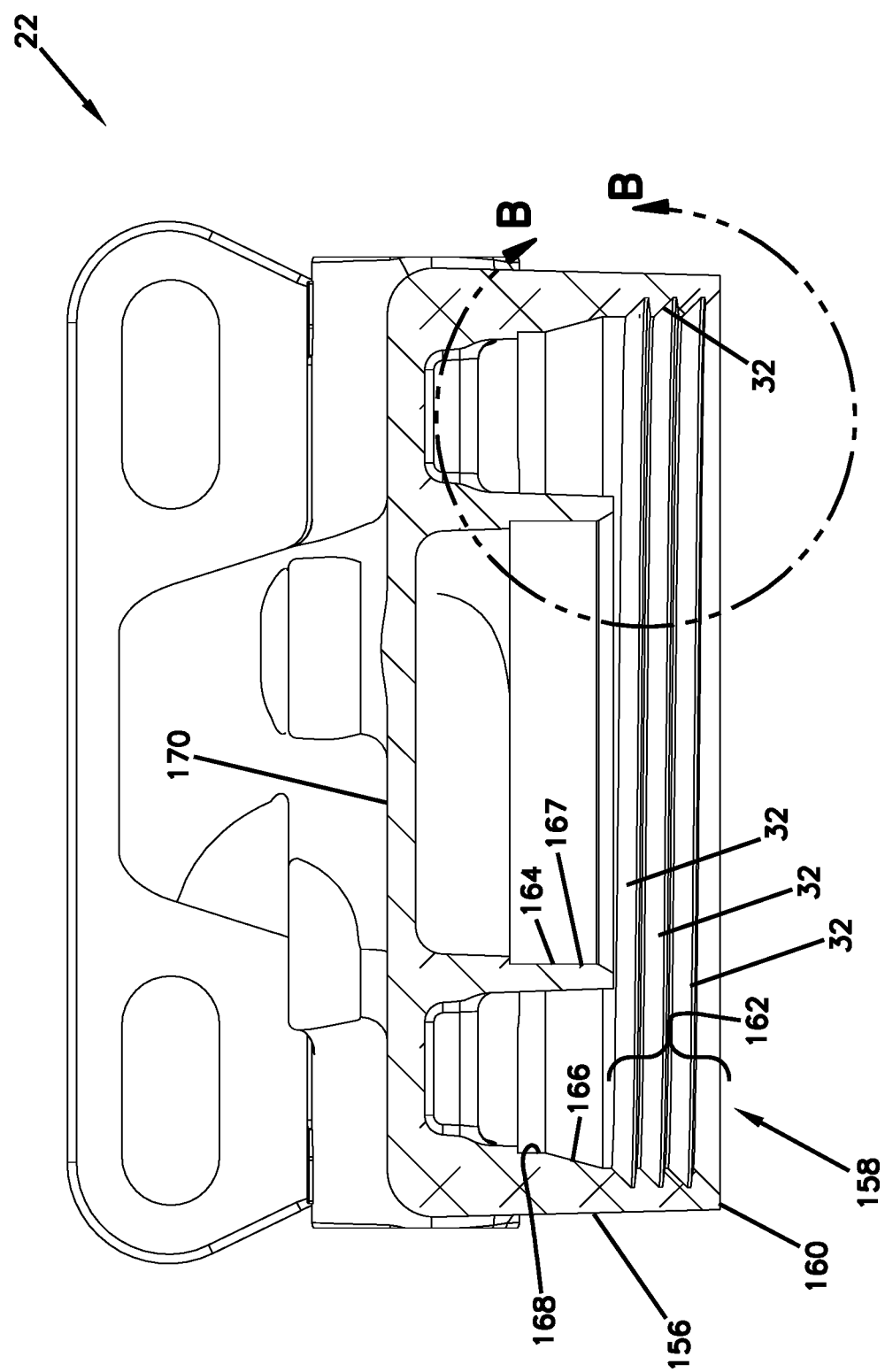
FIG. 8 is a cross-sectional view of the filter head shown as part of the filter assembly of FIG. 4.

Attention is now directed to the filter head 22 as can be seen in FIGS. 3, 4, 8, and 9. The filter head 22 has an outer wall 156. The outer wall 156 surrounds a cartridge receiving interior 158 (FIG. 8). The outer wall 156 has an end rim 160. The end rim 160 will engage against the stop member 128 when the filter cartridge 24 is operably mounted to the filter head 22. The filter head 22 further includes a threaded region 162 (FIG. 8), which includes threads 32. The threaded region 162 is along an inside surface 168 of the wall 156 and is oriented toward and is in communication with the cartridge-receiving interior 158. The threaded region 162, in this embodiment, is immediately adjacent to the end rim 160.

The filter head 22 further includes an inner wall 164. The inner wall 164 is in the interior volume 158 and is spaced from the outer wall 156. The inner wall 164 is generally spaced axially above (in the view of FIG. 8 with the rim 160 at the most downward position) the threaded region 162. The inner wall 162 extends or projects into the interior 158 from an end 170 of the filter head 22. The inner wall 162 is oriented to form a seal 165 (FIG. 4) with the first end cap seal member 74, when the filter cartridge 24 is operably connected to the filter head 22. In the example embodiment shown, the seal 165 is formed between an inner radial surface 167 (FIG. 8) of the inner wall 162 and the radially outwardly directed first end cap seal member 74.

The filter head 22 further includes a ramp 166. The ramp 166 is along the inside surface 168 of the outer wall 156 and in communication with the cartridge receiving interior 158. The ramp 166, in the example shown, is located adjacent the threaded region 162 and spaced axially between the threaded region 162 and the end 170 of the filter head 22. The end 170, in the orientation shown in FIGS. 4 and 8, is an upper surface and is opposite of the end rim 160.

The ramp 166 is angled in a direction toward the cartridge receiving interior 158 and is positioned to engage the housing seal member 110 to form seal 172 (FIGS. 4 and 10) with the filter cartridge 24 when the filter head 22 and the filter cartridge 24 are operably attached to each other.

The threaded region 162 is located between the ramp 166 and the end rim 160. This is arranged such that the ramp 166 will press against the housing seal member 110 while the threaded region 162 engages (mates with) the threaded section 106 (FIG. 7) of the filter cartridge 24.

Figure 9:
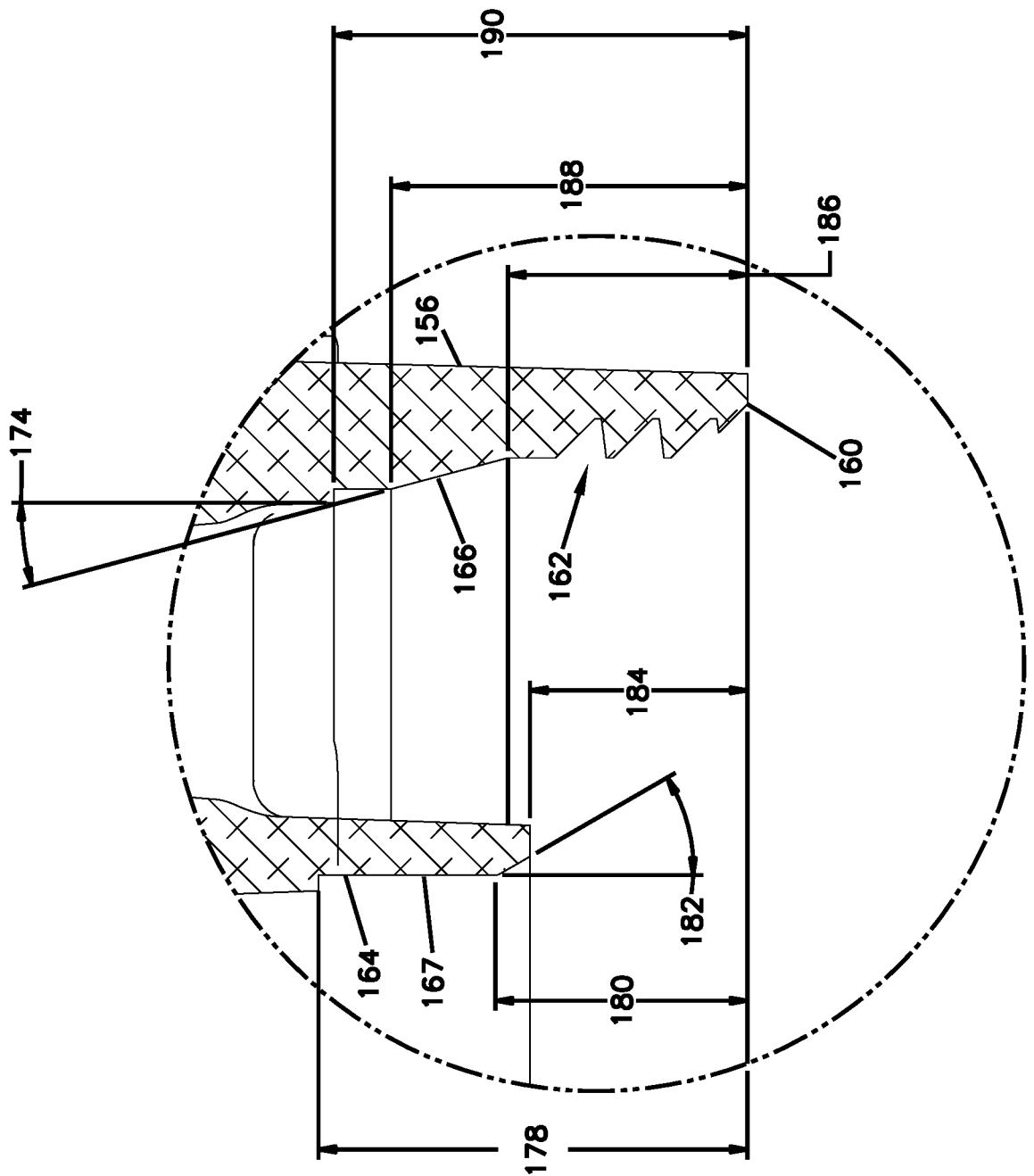
FIG. 9 is an enlarged view of Section B-B of FIG. 8.

Attention is directed to FIG. 9, which illustrates Section B-B of FIG. 8. Example dimensions are shown, which can lead to embodiments with advantages over the prior art. An angle of the ramp 166 is shown at Ref. 174. This is an operable section of the ramp 166. By "operable section of the ramp" it is meant the portion of the ramp 166 that presses against the housing seal member 110 to form seal 172 between the filter cartridge 24 and the filter head 22. The angle 174 of the ramp 166 is measured from the outer wall 156 of the filter head 122. The ramp 166 inclines as it extends from the threaded region 162 in a direction away from the end rim and 160 and toward the end 170. The angle 174 is between 5 and 45 degrees from the outer wall 156 of the filter head. In some embodiments, the ramp 166 is angled between 10 and 30 degrees from the outer wall 156 of the filter head 22. More preferably, the ramp 166 is angled between 12 and 18 degrees, such as about 15 degrees from the other wall 156 of the filter head 22.

Other useful dimensions for the filter head, to result in advantages over the prior art, are shown in the table below:

| Dimension | At least (mm) | No greater than (mm) | Preferably (mm) |
|---|---|---|---|
| 178 | 15 | 30 | 20-25, about 22 |
| 180 | 7 | 20 | 10-15, about 13 |
| 182 | 10 degrees | 70 degrees | 25-35, about 30 degrees |
| 184 | 5 | 17 | 9-13, about 11 |
| 186 | 6 | 18 | 10-14, about 12 |
| 188 | 10 | 25 | 15-20, about 18 |
| 190 | 14 | 29 | 19-24, about 21 |

In FIG. 4, the filter head 22 includes an inlet arrangement 192 with an inlet port 194 providing access into the cartridge receiving interior 158. The filter head 22 further includes an outlet arrangement 196 having an outlet port 198.

The inlet arrangement 192 conveys liquid filter to the filter head 22 and allows it to enter the filter head 22 to the inlet port 194. The liquid then flows into the filter cartridge 24, through the filter media construction 48, then through the opening 62 of the first end cap 60. From there, the filtered liquid flows back into the filter head 22 and then through the outlet port 198 to exit the filter head 22 where it can be used by downstream equipment.

Experimental

Testing was done to test the torque needed to operably install (form seals 172 and 165) and to dismount a filter cartridge onto a filter head. A filter head and filter cartridge in accordance with principles of this disclosure, as shown in FIG. 4 (cartridge having part number 0057A3464 TR, and head having part number 0057A3462) was compared to a prior art filter cartridge, having part number P573836, and filter head having part number P573832. The prior art filter cartridge and filter head is of the type as shown in WO 2009/149186 (FIGS. 19, 19A, and 16A), which is incorporated herein by reference. Note that this prior art filter head does not have a ramp 166, but instead, the filter head has a wall at the comparable section that is a straight, vertical section parallel to the central axis 55 of the filter cartridge. The results were as follows:

| Cartridge Part No. | Head Part No. | Trial No. | On (N-M) | Off (N-M) | Av. On (N-M) | % Red. |
|---|---|---|---|---|---|---|
| P573836 | P573832 | 1 | 15.7 | 18.5 | 16.5 | N/A |
| P573836 | P573832 | 2 | 17.9 | 17.8 | | |
| P573836 | P573832 | 3 | 15.7 | 17.6 | | |
| 0057A3464TR | 0057A3462 | 1 | 6.2 | 4.6 | 7.1 | 57 |
| 0057A3464TR | 0057A3462 | 2 | 8.1 | 6.0 | | |
| 0057A3464TR | 0057A3462 | 3 | 7.1 | 5.3 | | |

From these results, it can be seen how the seal 172 (FIG. 4) between the housing seal member 110 and the filter head 22 is formed using a torque of no greater than 10 N-m. Indeed, the seal 172 can be formed using a torque less than 55% needed to form an operable seal using a comparable filter head that has a straight section instead of a ramp. In many embodiments, the seal 172 is formed using a torque of no greater than 8.2 N-m. In many instances, the torque will require a force of at least 6 N-m to form the seal 172. Compared to the prior art, this represents a percent in reduction of torque needed of over 50%, indeed, over 55%, for example 57%.

From the above, it can be appreciated that disconnecting the filter cartridge 24 and the filter head 22 will require a torque of less than 10 N-m. Indeed, the torque will often be less than 7 N-m. In preferred arrangements, disconnecting the filter cartridge 24 and the filter head 22 will use a torque of less than 6.5 N-m. In many instances, the torque required to disconnect the filter cartridge 24 and filter head 22 will be greater than 5 N-m. When compared to the prior art P573836, the torque needed to disconnect is reduced by over 50%; indeed, by over 65%; and in some examples, by 75% or greater.

FIGS. 11-19

FIGS. 11-19 illustrate alternate useful embodiments that can be used with the filter cartridge 24 and filter head 22 that provide a workable design leading to advantage. Advantages for each of these embodiments include those that improve the prior art such as having the ability to mount the filter cartridge 24 on the filter head 22 using torque smaller than the prior art, as well as, providing the seal with only a few revolutions and thereby avoiding the difficulty caused with possible cross-threading.

Figure 11:
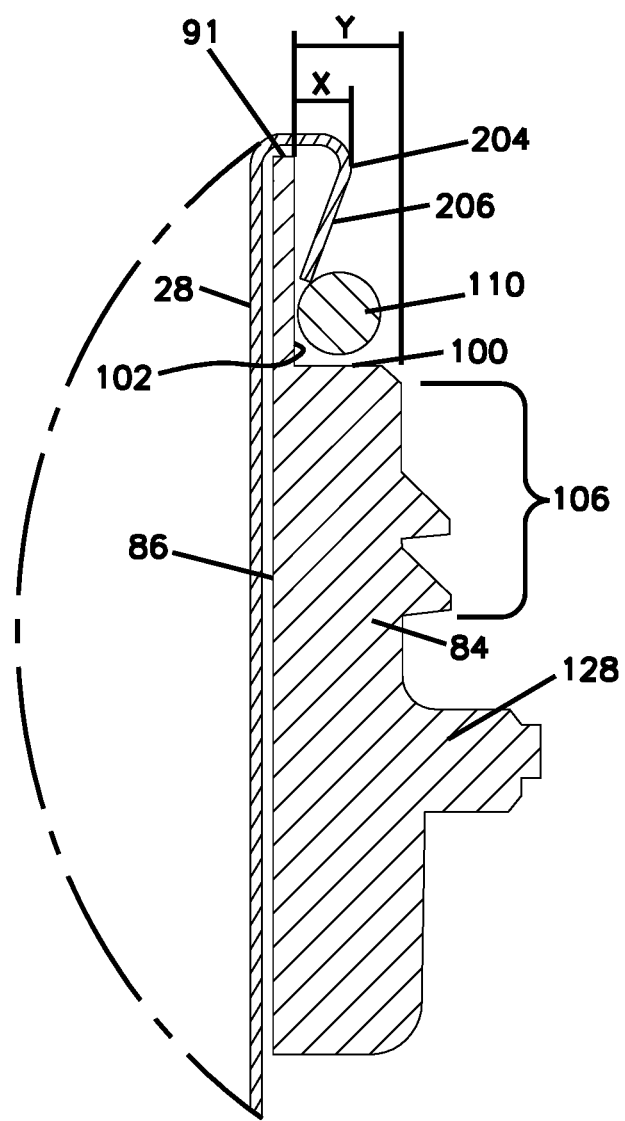
FIG. 11 is an enlarged cross-sectional view, similar to FIG. 10, but without the filter head shown and depicting another embodiment.

In the FIG. 11 embodiment, the sleeve 84 is ribless. It differs from FIGS. 7 and 10 in that there is no rib 96 (FIG. 7) projecting from the recess wall 102. The housing 28 is depicted as folded over the first end 91 of the sleeve 84 and has a projection 204 extending radially away from the recess wall 102. From a radially outwardly most point of the projection 204 of the housing 28, the housing 28 has a slope 206 that extends radially inwardly toward the recess wall 102 as it extends in a direction toward the base surface 110. The outwardly most point of projection 204 extends a distance X from the recess wall 102. The radial length 108 (in FIG. 7) and shown as Y is the distance from the recess wall 102 to the threaded section 106. Advantages are achieved when the distance X is less than or equal to 80% of the distance Y. Advantages include the ability to mount the filter cartridge 24 on the filter head 22 using torque smaller than the prior art, as well as, providing the seal with only a few revolutions and thereby avoiding the difficulty caused with possible cross-threading.

Figure 12:
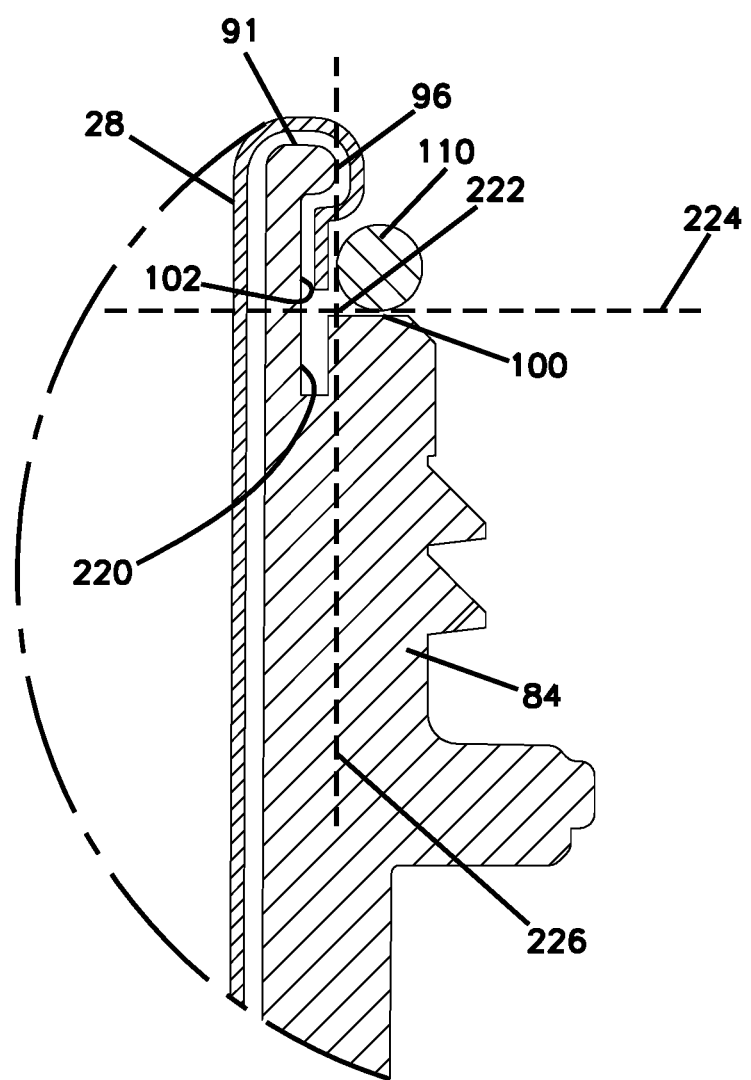
FIG. 12 is an enlarged cross-sectional view, similar to FIG. 10, but without the filter head shown and depicting another embodiment.

In the FIG. 12 embodiment, the recess wall 102 includes a pocket 220 that extends beyond (below in the orientation of FIG. 12) the base surface 100. In this embodiment, there is a horizontal line 224 that is the tangent line along a portion of the seal member 110 that is oriented adjacent, or against, the base surface 100. In the orientation of FIG. 12, this is also the line 224 passing through (or tangent to) a lowest point of the seal member 110. There is a line 226 that is the tangent line along the most radially inwardly portion of the seal member 110. In many examples, the line 226 is about parallel to the recess wall 102. An intersection between line 224 and line 226 forms joint 222. The housing seal member 110 has a sealing compression region 114 (see FIG. 10), and the sealing compression region 114 in cross-section is defined by compression region line 116 (FIG. 10). Advantages result when the line 118 (FIG. 10), which is perpendicular to the compression region line 116, passes through the joint 222 and the housing seal member 110. Advantages include the ability to mount the filter cartridge 24 on the filter head 22 using torque smaller than the prior art, as well as, providing the seal with only a few revolutions and thereby avoiding the difficulty caused with possible cross-threading.

Figure 13:
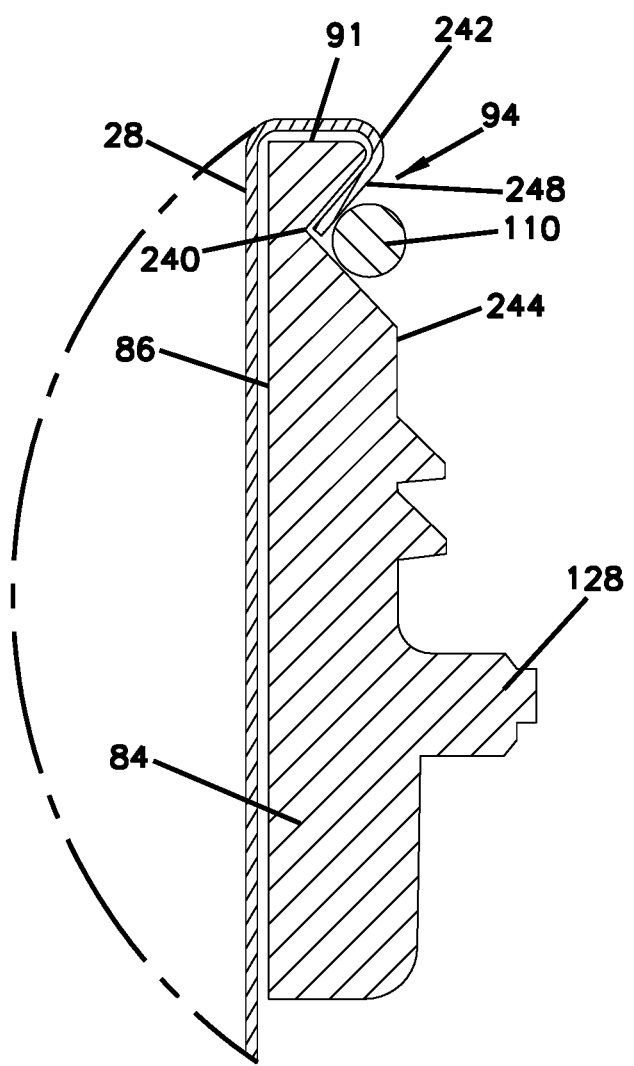
FIG. 13 is an enlarged cross-sectional view, similar to FIG. 10, but without the filter head shown and depicting another embodiment.

In the FIG. 13 embodiment, the sleeve 84 has no recess wall 102. The seal holder recess 94, has a non-rectangular cross-section, which can be many shapes, including regular polygonal or irregular polygonal. In the example depicted in FIG. 13, the seal holder recess 94 is triangular shaped having a radially inward most portion 240. The housing 28 is depicted as folded over the first end 91 of the sleeve 84 and has a projection 242 extending radially away from the inner portion 86 of the sleeve 84. From projection 242 of the housing 28, the housing 28 has a slope 246 that extends radially inwardly toward the recess 94 inward portion 240. The angle of the slope will be at least 2°, not greater than 60°, for example about 30-50°. There is also the minor thread diameter shown at 244. Advantages result when the distance from inward most portion 240 to projection 242 is less than or equal to 80% of the distance between inward most portion 240 and the minor thread diameter 244. Advantages include the ability to mount the filter cartridge 24 on the filter head 22 using torque smaller than the prior art, as well as, providing the seal with only a few revolutions and thereby avoiding the difficulty caused with possible cross-threading.

Figure 14:
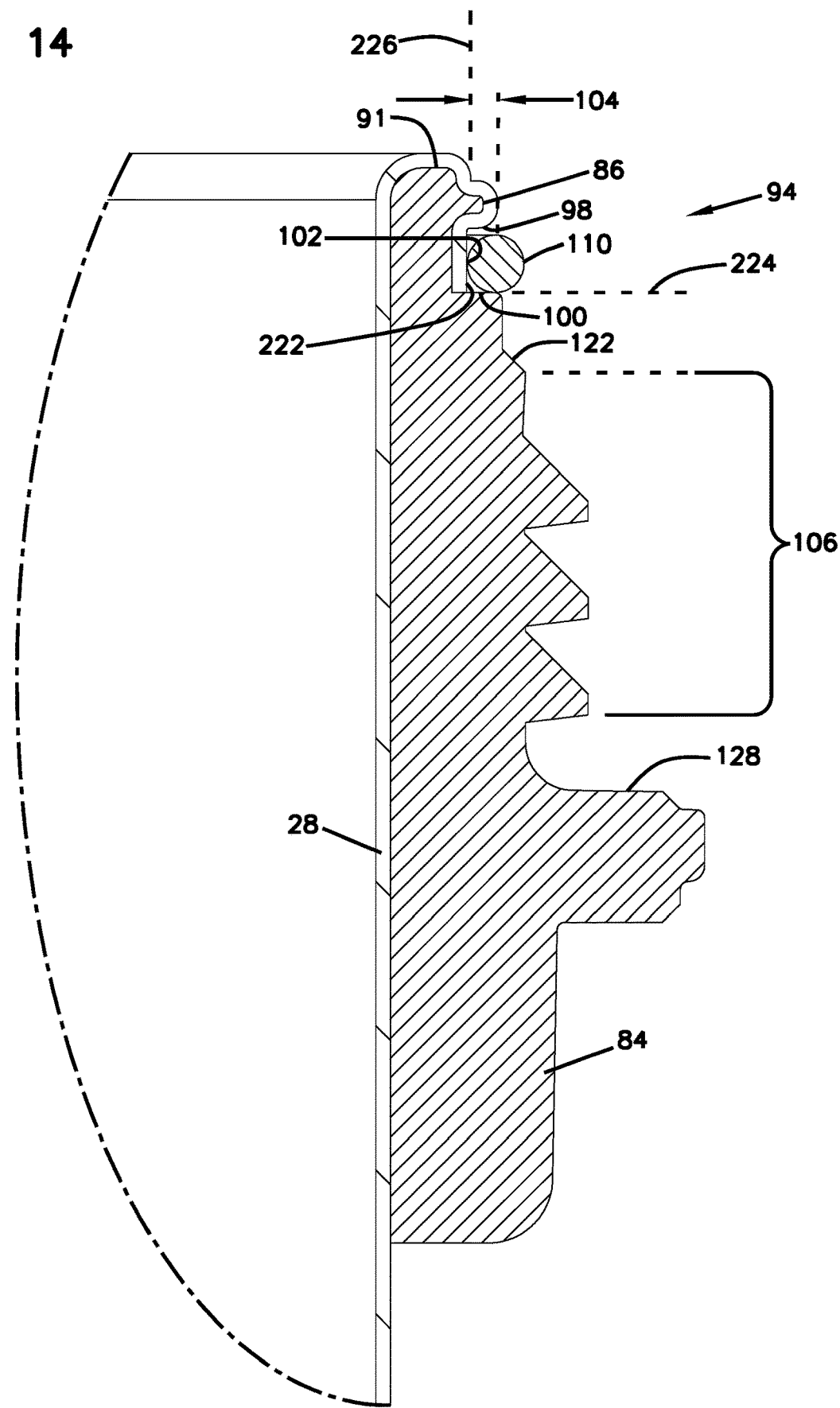
FIG. 14 is an enlarged cross-sectional view, similar to FIG. 10, but without the filter head shown and depicting another embodiment.

In the FIG. 14 embodiment, the sleeve 84 has outwardly radially projecting rib 96 and is adjacent the first end 91 to forms ceiling 98 of the recess 94. By "adjacent the first end 91" it is meant that the rib 96 can be either be even with the first end 91 or spaced from (either toward or away) a remaining portion of the sleeve 84 by a few mm, e.g., 5 mm or fewer. In this embodiment, the rib 96 is adjacent the first end 91 by being spaced from the first end 91. Radially extending base surface 100 is opposite of the ceiling 98 forming a floor of the recess 94. The recess wall 102 extends axially between the ceiling 98 and the base surface 100. The base surface 100 has radial base length 104 extending from the recess wall 102. The housing 28 is folded over the first end 91 of the sleeve 84 and overlaps and forms part of the rib 96. The housing 28 also extends along and hugs the recess in the sleeve to form part of the ceiling 98 and recess wall 102. In this embodiment, the housing 28 extends to the base surface 100.

Figure 15:
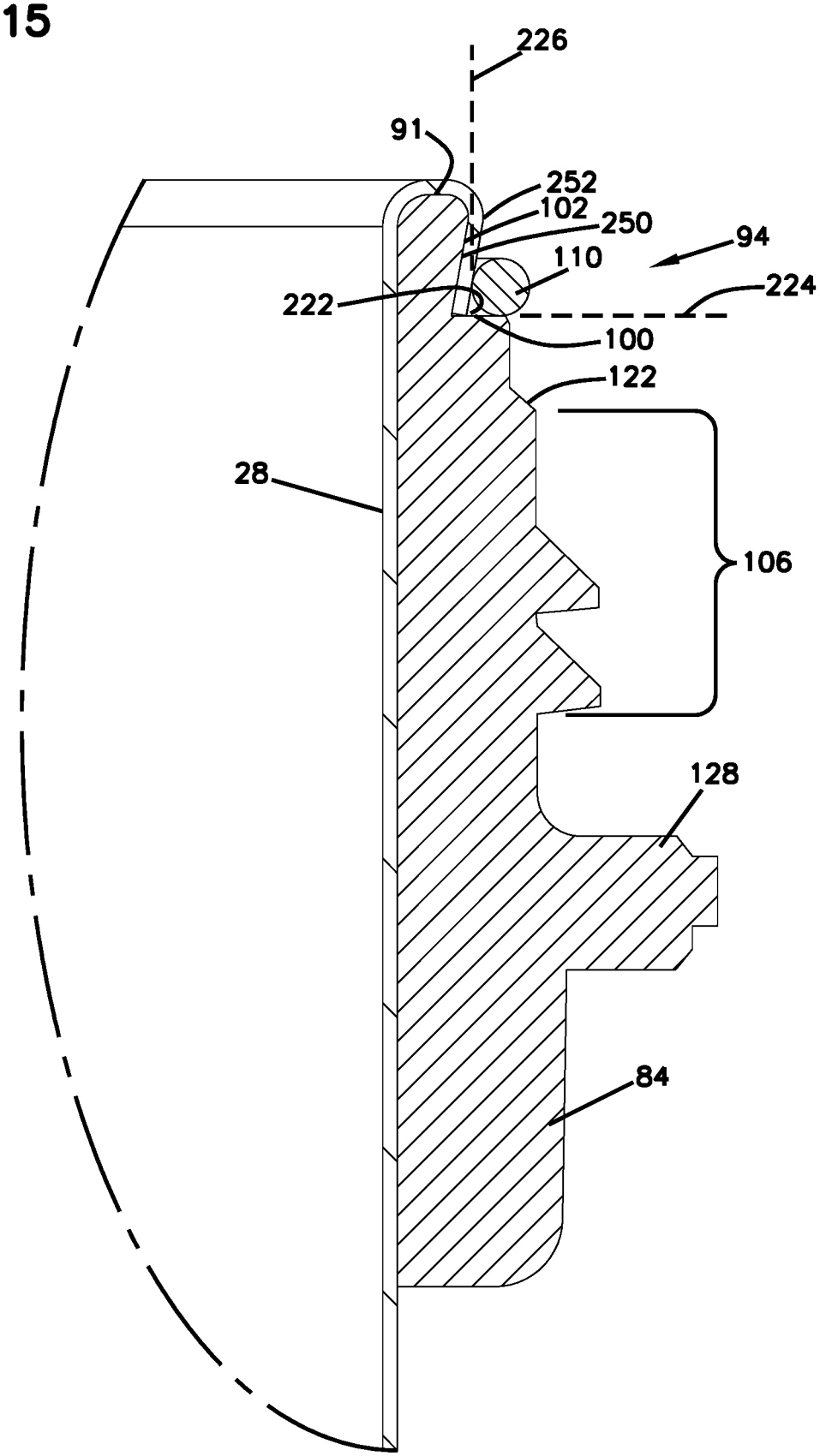
FIG. 15 is an enlarged cross-sectional view, similar to FIG. 10, but without the filter head shown and depicting another embodiment.

In the FIG. 15 embodiment, the sleeve 84 is ribless. It differs from FIGS. 7 and 10 in that there is no rib 96 (FIG. 7) projecting from the recess wall 102. The recess wall 102 has a ramp 250 extending radially inwardly as the ramp 250 extends from the first end 91 of the sleeve to the base surface 100. The ramp 250 is angled sufficiently to retain the seal member 110 in place and prevent it from rolling off the sleeve 84. Useful slope angles for the ramp 250 include at least 2°, not greater than 60°, for example about 3-10°. Housing 28 is depicted as folded over the first end 91 of the sleeve 84 and overlapping the ramp 250 to form housing ramp 252. The housing ramp 252, in this embodiment, is against the sleeve ramp 250 and can have about the same slope as the sleeve ramp 250 to extend radially inwardly as it extends from the first end 91 to the base surface 100.

Figure 16:
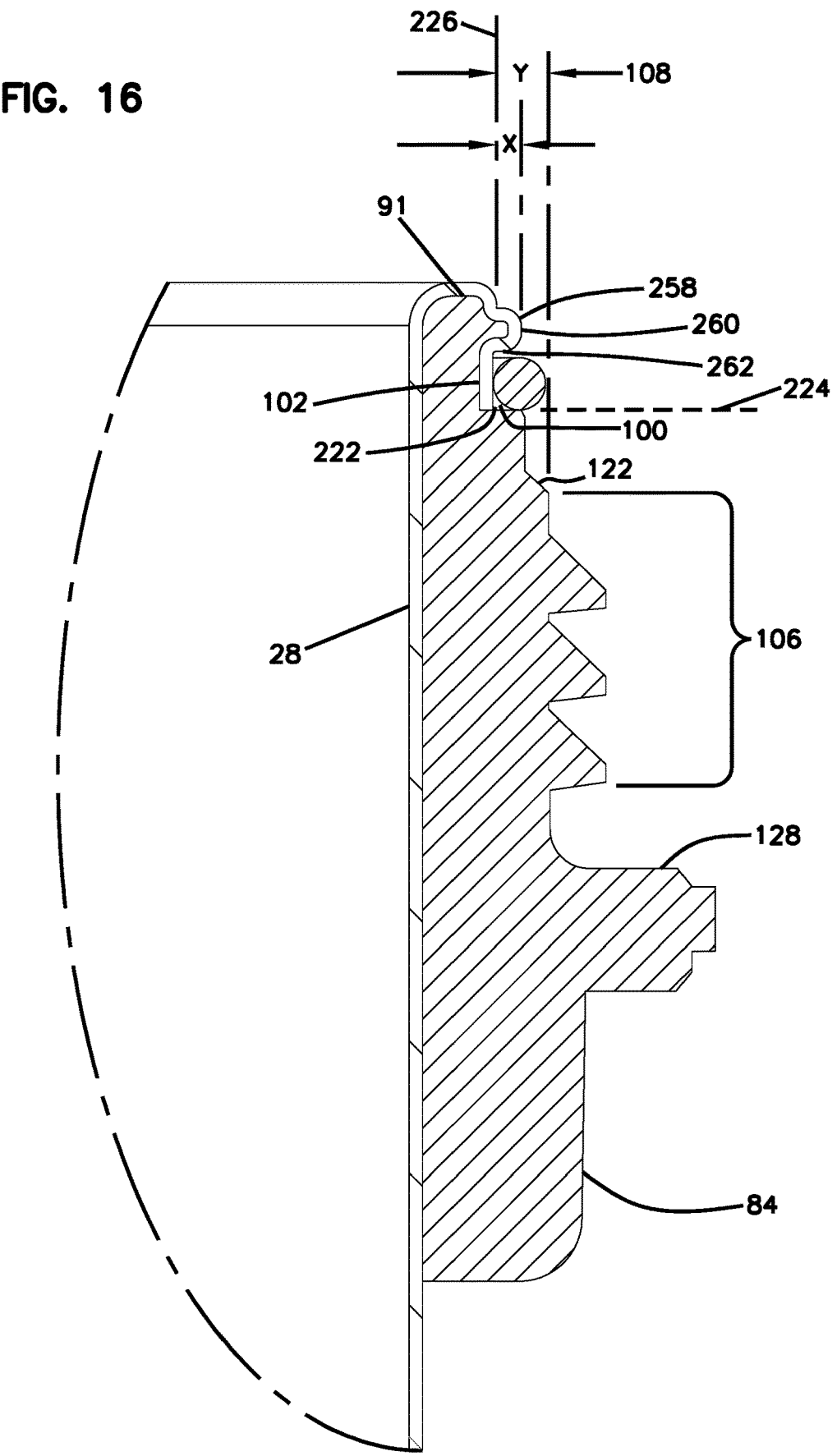
FIG. 16 is an enlarged cross-sectional view, similar to FIG. 10, but without the filter head shown and depicting another embodiment.

In the FIG. 16 embodiment, the sleeve 84 is ribless as the recess wall 102 extends straight between the first end 91 and the base surface 100. The housing 28 is depicted as folded over the first end 91 of the sleeve 84 and has a housing rib or projection 258 extending radially away from the recess wall 102. In this embodiment, the housing rib or projection 258 extends radially outward to a bight section 260, which is the most radially outward point of the projection 258. The projection 258 forms a ceiling 262 to the seal holder recess 94. At the base of the projection 258, the housing extends along the recess wall 102 to the base surface 100. The outwardly most point of projection 258 extends a distance X from the recess wall 102. The radial length 108 (in FIG. 7) and shown as Y is the distance from the recess wall 102 to the threaded section 106. Advantages are achieved when the distance X is less than or equal to 80% of the distance Y.

Each of the embodiments of FIGS. 14-16 include the advantages illustrated in FIG. 10, That is, the housing seal member 110 is held within the recess 94 and forms seal 172 with the filter head 22. The housing seal member 110 has sealing compression region 114, which is a portion of the housing sealing member 110 that receives the compressive force to form the seal 172 with the filter head 22. The sealing compression region 114, when viewed in cross-section, such as shown in FIG. 10, is defined by a compression region line 116. The compression region line 116 is viewable in FIG. 10 and in FIG. 5. A line 118 (FIG. 10) perpendicular to the compression region line 116 passes through the joint 112 in the seal holder recess 94 and the seal member 110.

In each of the embodiments of FIGS. 14-16, there is horizontal line 224 that is the tangent line along a portion of the seal member 110 that is oriented adjacent, or against, the base surface 100. In these embodiments, this is also the line 224 passing through (or tangent to) a lowest point of the seal member 110. There is line 226 that is the tangent line along the most radially inwardly portion of the seal member 110. In many examples, the line 226 is about parallel to the recess wall 102, but note that line 226 is not parallel to recess wall 102 in FIG. 15. An intersection between line 224 and line 226 forms joint 222. The housing seal member 110 has a sealing compression region 114 (see FIG. 10), and the sealing compression region 114 in cross-section is defined by compression region line 116 (FIG. 10). Advantages result when the line 118 (FIG. 10), which is perpendicular to the compression region line 116, passes through the joint 222 and the housing seal member 110.

Figure 17:
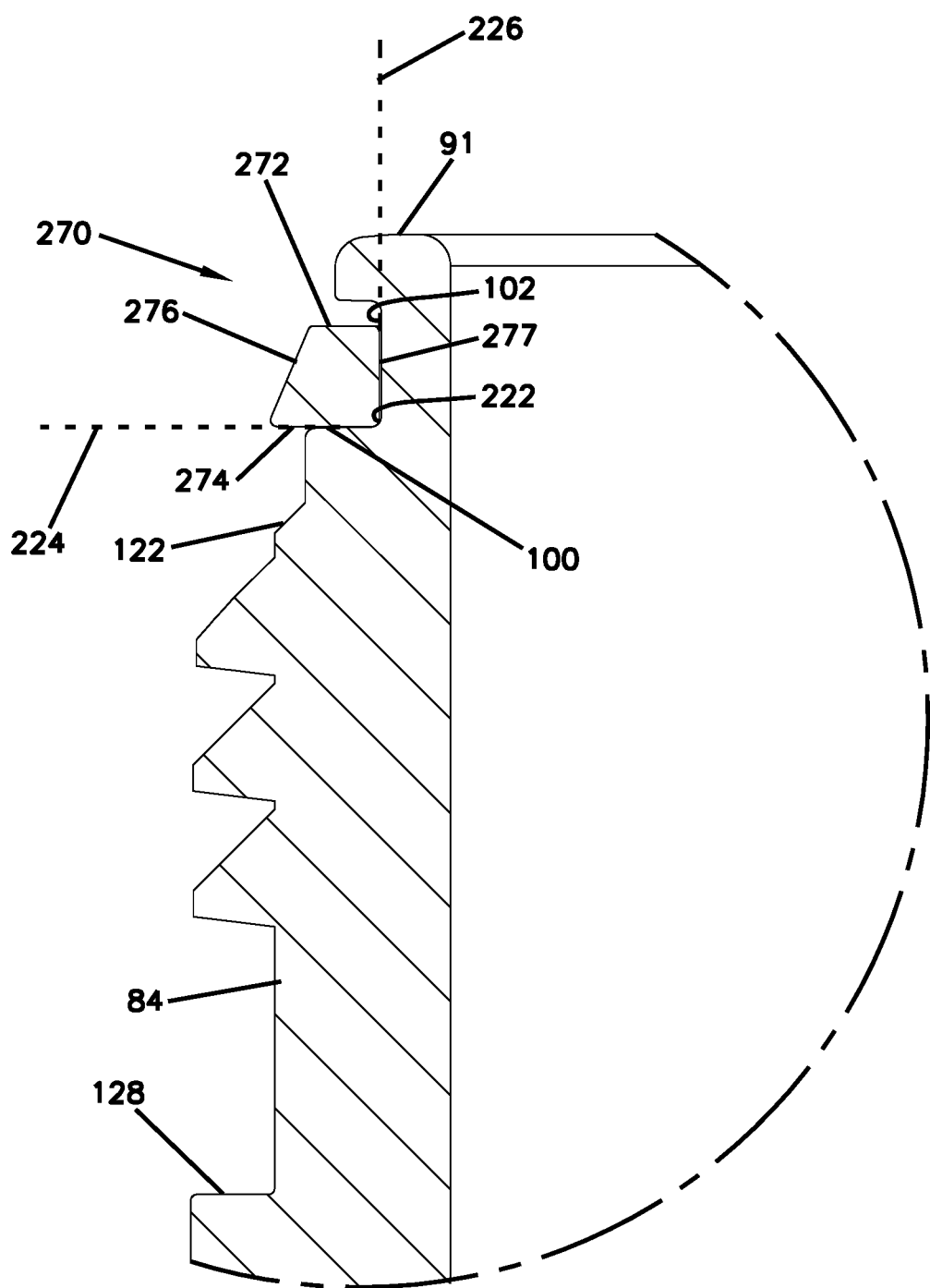
FIG. 17 is an enlarged cross-sectional view, similar to FIG. 10, but without the filter head shown and depicting another embodiment.
Figure 18:
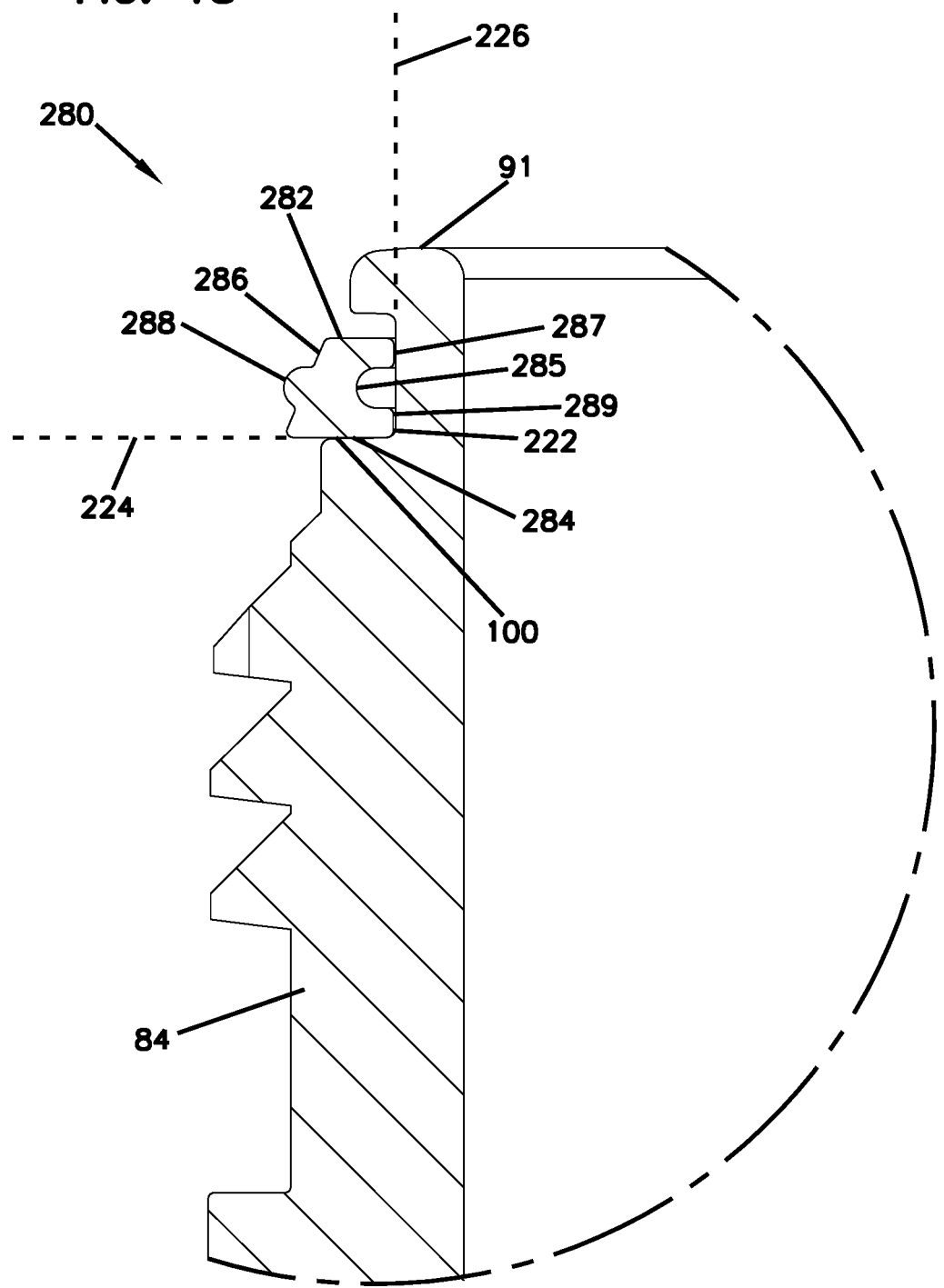
FIG. 18 is an enlarged cross-sectional view, similar to FIG. 10, but without the filter head shown and depicting another embodiment.

FIGS. 17-19 illustrate the use of housing seal members 110 that do not have a round cross-sectional shape. These embodiments provide workable designs leading to advantage. Advantages for each of these embodiments include those that improve the prior art such as having the ability to mount the filter cartridge 24 on the filter head 22 using torque smaller than the prior art, as well as, providing the seal with only a few revolutions and thereby avoiding the difficulty caused with possible cross-threading.

In FIG. 17, the housing seal member 270 has a trapezoid-shaped cross-section with a straight top surface 272 (top surface being the one closest to the mouth 40, when oriented with the mouth 40 in the uppermost location) being shorter than a straight bottom surface 274. Sealing surface 276 is a straight surface angled downward and away from the top surface 272, as the sealing surface 276 extends from the top surface 272 to the bottom surface 274. The seal member 270 has a generally straight section 277 that is adjacent to the recess wall 102 and extends between the top surface 272 and bottom surface 274.

In FIG. 18, the housing seal member 280 has a straight top surface 282 (top surface being the one closest to the mouth 40, when oriented with the mouth 40 in the uppermost location) being shorter than a straight bottom surface 284. Sealing surface 286 is angled downward and away from the top surface 282, as the sealing surface extends from the top surface 282 to the bottom surface 284. In this embodiment, the sealing surface 286 includes an outwardly radially projecting rib 288 extending therefrom. The seal member 280 has a pair of straight sections 287, 289 with a recess 285 therebetween that is adjacent to the recess wall 102 and extends between the top surface 282 and bottom surface 284

In FIG. 19, the housing seal member 290 has an X cross-sectional shape. The X shape includes portions 291, 293 that are oriented closest to or against the base surface 100. The X shape includes portions 295, 297 against the recess wall 102.

In each of the embodiments of FIGS. 17-19, there is horizontal line 224 that is the tangent line along a portion of the seal member 270, 280, 290 that is oriented adjacent, or against, the base surface 100. By "tangent", in the embodiments of FIGS. 17 and 18, the bottom surface 274, 284 is a straight surface, so the line 224 tangent to the cross sectional line showing the bottom surface 274, 284 is the line depicting the bottom surface 274, 284 itself. In the embodiment of FIG. 19, the "tangent" line 224 is a line that is tangent to each of portions 291, 293. In these embodiments, this is also the line 224 passing through (or tangent to) a lowest point of the seal member 270, 280, 290.

Also in FIGS. 17-19, there is line 226 that is the tangent line along the most radially inwardly portion of the seal member 270, 280, 290. In many examples, the line 226 is about parallel to the recess wall 102. By "tangent", in FIG. 17, the section 277 adjacent to the recess wall 102 is a straight surface, so the line 226 tangent to the cross section line showing the section 277 is the line depicting the section 277 itself. In FIG. 18, the pair of sections 287, 289 adjacent to the recess wall 102 are straight, so the line 226 tangent to the cross sectional lines showing 287, 289 is depicting sections 287, 289 themselves. In FIG. 19, the tangent line 226 is a line that is tangent to each of portions 295, 297.

An intersection between line 224 and line 226 forms joint 222. The housing seal member 270, 280, 290 has a sealing compression region 114 (see FIG. 10), and the sealing compression region 114 in cross-section is defined by compression region line 116 (FIG. 10). Advantages result when the line 118 (FIG. 10), which is perpendicular to the compression region line 116, passes through the joint 222 and the housing seal member 110. Advantages include lower torque requirements to connect filter cartridge 24 on the filter head 22.

Methods

The arrangements as described in connection with FIGS. 1-13 can be used in methods. One method is a method of installing filter cartridge 24 onto filter head 22. The method includes providing filter head 22 having an inlet arrangement 192, outlet arrangement 196, and outer wall 156 surrounding a cartridge-receiving interior 158. The outer wall 156 includes a rim 160 and threaded region 162 orientated toward the cartridge-receiving interior 158 adjacent the end rim 160.

The method includes a step of providing the filter cartridge 24. The filter cartridge 24 includes housing 28, filter media construction 48 operably oriented in interior volume 38, and sleeve 84. The sleeve 84 surrounds and is against the housing 28. The sleeve 84 includes a threaded section 106 and defines seal holder recess 94. Seal member 110 is within the seal holder recess 94 and projects radially outwardly therefrom.

The method includes a step of threadably mating the threaded section 106 of the sleeve 84 with the threaded region 162 of the filter head 22 to compress the seal member 110 and form an operable seal 172 between the filter head 22 and the filter cartridge 24. The seal 172 will be formed using a torque of less than 50% needed to form an operable seal using a comparable filter head that has a straight section instead of a ramp. In some examples, this torque is no greater than 10 N-m. By "operable seal", it is meant a seal that can withstand pressures of about 100 psi.

In preferred methods, the step of threadably mating will include forming the seal 172 using a torque less than 55% needed to form an operable seal using a comparable filter head that has a straight section instead of a ramp.

In preferred methods, the step of threadably mating will including forming the seal 172 using a torque of less than 6 N-m and no greater than 8.2 N-m.

The step of providing the filter head 22 includes providing the filter head outer wall 156 to have ramp 166. The threaded region 162 will be between the ramp 166 and the end rim 160. The step of threadably mating preferably includes compressing the ramp 166 against the seal member 110 to form the seal 172 between and against the ramp 166 and the sleeve 84.

The step of providing the filter head 22 may include providing the filter head outer wall 156 to have the ramp 166 that in angled between 12 and 18 degrees from the outer wall 156 filter head 22.

The method may further include a step of disconnecting the filter cartridge 24 and the filter head 22. This step will be after the step of threadably mating. The step of disconnecting the filter cartridge 24 from the filter head 22 will use a torque of less than 10 N-m.

In preferred arrangements, the step of disconnecting the filter cartridge 24 and the filter head 22 will use a torque of less than 7 N-m.

In some preferred arrangements, after the step of threadably mating, the step of disconnecting the filter cartridge 24 and the filter head 22 will use a torque of less than 6.5 N-m and greater than 5 N-m.

The step of providing a filter cartridge can include providing a filter cartridge 24 as variously characterized above, with certain features selected for advantage, but not necessarily requiring all features.

The step of providing the filter head can include providing the filter head 22 as variously characterized above, with selective features for advantage, but not necessarily requiring all features.

Materials

For spin on filters, the usable materials for the filter housing 28 can include metals such as for example steel or aluminum. For bowl cartridge filters useable materials for the bowl can include plastics, metals, composites, or other materials capable of withstanding pressures typically experienced in filtration applications. Usable materials for the sleeve 84 can include plastic, metal, or other materials capable of withstanding the torque, pressures, and temperatures typically experienced in filtration applications.

General Aspects of Principles of this Disclosure

A filter cartridge comprises a housing; a filter media construction in the housing; and a sleeve on an outside of the housing; the sleeve being threaded and holding a housing seal member.

The housing has a surrounding wall defining an interior volume, an open mouth in communication with the interior volume and a bottom opposite of the mouth; the surrounding wall having an interior surface in communication with the interior volume and an opposite exterior surface.

The filter media construction is operably oriented in the interior volume of the housing.

The sleeve is oriented against the exterior surface of the surrounding wall of the housing; the sleeve has an inner portion and an opposite exterior portion, the inner portion is oriented against the exterior surface of the surrounding wall.

The sleeve includes opposite first and second ends, the first end being adjacent the open mouth of the housing.

The sleeve has a seal holder recess along the exterior portion; and the housing seal member is operably held in the seal holder recess.

The sleeve has a seal holder recess with a radially extending base surface.

The sleeve has a seal holder recess with a recess wall.

The sleeve has a seal holder recess with a radially extending base surface and a recess wall; the base surface having a radial base length extending from the recess wall.

An outwardly radially projecting rib is adjacent to the first end of the sleeve forming a ceiling of the recess.

The rib is part of the sleeve.

The rib is part of the housing.

The rib is even with the first end of the sleeve.

The rib is spaced from the first end of the sleeve.

The sleeve includes a plurality of threads projecting radially outwardly from a threaded section of the exterior portion of the sleeve.

The sleeve includes a plurality of threads projecting radially outwardly from a threaded section of the exterior portion of the sleeve between the second end and the base surface, the threaded section having a radial length measured from the recess wall.

The radial length of the threaded section is greater than the radial base length.

The seal holder recess has a joint at an intersection between the base surface and the recess wall.

The housing seal member has a sealing compression region; the sealing compression region in cross-section being defined by a compression region line.

A line perpendicular to the compression region line passes through the joint in the seal holder recess and the housing seal member.

The rib has a length less than 80% of the radial base length.

The outwardly radially projecting rib has a length less than 60% of the radial base length.

The outwardly radially projecting rib has a length less than 55% of the radial base length.

The rib extends radially away from the recess wall a distance less than the base surface extends away from the recess wall.

The base surface is located at least 4 mm and no greater than 15 mm from an axial rim defining the mouth of the housing.

The base surface is located at least 7 mm and no greater than 11 mm from an axial rim defining the mouth of the housing.

The sleeve includes a bevel surface between the base surface and the threaded section; the bevel surface being angled relative to the threaded section at an angle between 10-50°.

The sleeve includes a bevel surface between the base surface and the threaded section; the bevel surface being angled relative to the threaded section at an angle between 12-30°.

The sleeve includes a bevel surface between the base surface and the threaded section; the bevel surface being angled relative to the threaded section at an angle between 13-17°.

The bevel surface has an axial length between the base surface and the threaded section of 0.7-2 mm.

The bevel surface has an axial length between the base surface and the threaded section of 0.8-1.5 mm.

The sleeve includes a radially extending stop member between the threaded section and the second end.

The stop member is located at least 17 mm and no greater than 30 mm from an axial rim defining the mouth of the housing.

The stop member is located at least 18 mm and no greater than 28 mm from an axial rim defining the mouth of the housing.

The stop member projects radially outwardly a distance greater than any other portion of the sleeve.

The filter media construction comprises a cylinder of pleated filter media secured between first and second end caps A ring projects axially from the first end cap in a direction away from a remaining part of the filter media construction; and a first end cap seal member is held by the ring.

The first end cap seal member projects radially outwardly from the ring.

The filter media construction is fixed and non-removably mounted in the interior volume of the housing.

The housing bottom includes a drain valve.

The housing seal member projects radially outwardly farther than the rib.

The wall of the housing overlaps the first end of the sleeve.=

The wall of the housing overlaps the projecting rib and is in extension along the exterior portion of the sleeve along the recess wall.

A filter head removably attached to the filter cartridge.

The filter head includes an outer wall surrounding a cartridge-receiving interior; the outer wall having an end rim, a threaded region oriented toward the cartridge-receiving interior adjacent to the end rim, and a ramp; the ramp being angled in a direction toward the cartridge-receiving interior and positioned to engage the housing seal member to form a seal with the filter cartridge when the filter head and filter cartridge are operably attached to each other.

The threaded region is in between the ramp and the end rim.

An operable section of the ramp is angled between 5 and 45 degrees from the outer wall of the filter head.

An operable section of the ramp is angled between 10 and 30 degrees from the outer wall of the filter head.

An operable section of the ramp is angled between 12 and 18 degrees from the outer wall of the filter head.

The filter head includes an inlet arrangement for conveying unfiltered fluid to the filter cartridge and an outlet arrangement for conveying filtered fluid from the filter cartridge.

A filter assembly includes a filter head having a ramp; a filter cartridge removably attached to the filter head; the filter cartridge having a seal member; and wherein the ramp on the filter head is compressed against the seal member to form a seal between the filter head and the filter cartridge.

The filter head includes an inlet arrangement, an outlet arrangement, and an outer wall surrounding a cartridge-receiving interior; the outer wall having an end rim, a threaded region oriented toward the cartridge-receiving interior adjacent to the end rim.

The filter cartridge includes a housing, a filter media construction operably oriented in an interior volume of the housing, and a sleeve surrounding and against the housing.

The sleeve includes a threaded section mateably engaging the threaded region of the filter head, a seal holder recess, and the seal member being within the seal holder recess and projecting radially outwardly.

An operable section of the ramp is angled between 5 and 45 degrees from the outer wall of the filter head.

An operable section of the ramp is angled between 10 and 30 degrees from the outer wall of the filter head.

An operable section of the ramp is angled between 12 and 18 degrees from the outer wall of the filter head The sleeve has an inner portion and an opposite exterior portion, the inner portion being oriented against an exterior surface of the housing; the sleeve including opposite first and second ends, the first end being adjacent an open mouth of the housing; wherein, the seal holder recess is along the exterior portion, the recess being defined by an outwardly radially projecting rib adjacent to the first end forming a ceiling, a radially extending base surface opposite of the ceiling, and a recess wall extending axially between the ceiling and the base surface; the seal holder recess has a joint being defined at an intersection between a line tangent to a lowest point of the seal member, when the cartridge is oriented with the mouth as uppermost, and a line tangent to a most radially inward portion of the seal member; and the ramp compressing against the housing seal member in cross-section along a compression region line; a line perpendicular to the compression region line passes through the joint in the seal holder recess and the housing seal member.

The sleeve includes a bevel surface between the base surface and the threaded section; the bevel surface being angled relative to the threaded section at an angle between 10-50°.

The sleeve includes a bevel surface between the base surface and the threaded section; the bevel surface being angled relative to the threaded section at an angle between 12-30°.

The sleeve includes a bevel surface between the base surface and the threaded section; the bevel surface being angled relative to the threaded section at an angle between 13-17°.

The bevel surface has an axial length between the base surface and the threaded section of 0.7-2 mm.

The bevel surface has an axial length between the base surface and the threaded section of 0.8-1.5 mm.

The sleeve includes a radially extending stop member between the threaded section and the second end.

The stop member is located at least 17 mm and no greater than 30 mm from an axial rim defining a mouth of the housing.

The stop member is located at least 18 mm and no greater than 28 mm from an axial rim defining a mouth of the housing.

The stop member projects radially outwardly a distance greater than any other portion of the sleeve.

The filter media construction comprises a cylinder of pleated filter media secured between first and second end caps A ring projects axially from the first end cap in a direction away from a remaining part of the filter media construction; and a first end cap seal member is held by the ring.

The first end cap seal member projects radially outwardly from the ring.

The filter media construction is fixed and non-removably mounted in the interior volume of the housing.

The filter cartridge further includes a drain valve.

A method of installing a filter cartridge on a filter head, the method comprising providing a filter head; providing a filter cartridge with a sleeve and a seal member; threadably mating a threaded section of the sleeve with a threaded region of the filter head to compress the seal member and form a seal between the filter head and the filter cartridge, the seal being formed using a torque less than 50% needed to form an operable seal using a comparable filter head that has a straight section instead of a ramp.

The step of providing a filter head includes providing a head having an inlet arrangement, an outlet arrangement, and an outer wall surrounding a cartridge-receiving interior; the outer wall having an end rim, and a threaded region oriented toward the cartridge-receiving interior adjacent to the end rim.

The step of providing a filter cartridge includes providing a housing, a filter media construction operably oriented in an interior volume of the housing, and a sleeve surrounding and against the housing; the sleeve having a threaded section; the sleeve defining a seal holder recess; the seal member being within the seal holder recess and projecting radially outwardly.

The step of threadably mating includes forming the seal using a torque less than 55% needed to form an operable seal using a comparable filter head that has a straight section instead of a ramp.

The step of threadably mating includes forming the seal using a torque of no greater than 10 N-m.

The step of providing a filter head includes providing the filter head outer wall to having a ramp, the threaded region being between the ramp and the end rim; and the step of threadably mating includes compressing the ramp against the seal member to form the seal between and against the ramp and the sleeve.

The step of providing a filter head includes providing the filter head outer wall to having the ramp that is angled between 12 and 18 degrees from the outer wall of the filter head.

After the step of threadably mating, disconnecting the filter cartridge and filter head by using a torque of less than 50% needed to disconnect using a comparable filter head that has a straight section instead of a ramp.

After the step of threadably mating, disconnecting the filter cartridge and filter head by using a torque of less than 65% needed to disconnect using a comparable filter head that has a straight section instead of a ramp.

After the step of threadably mating, disconnecting the filter cartridge and filter head by using a torque of less than 7 N-m.

The above represents example principles. Many embodiments can be made using these principles.

What is claimed is:

1. A filter cartridge comprising:
   (a) a housing having a connecting and sealing portion; an open mouth and a bottom opposite of the mouth; the housing defining an interior volume;

(b) a filter media construction operably oriented in the interior volume of the housing;
(c) wherein the connecting and sealing portion includes,
  (i) a seal holder recess along an exterior portion thereof;
    (A) the seal holder recess being defined by an outwardly radially projecting rib forming a ceiling of the recess, the seal holder recess including a radially extending base surface and a recess wall extending axially between the base surface and the ceiling;
    (B) the rib extending radially away from the recess wall a distance less than the base surface extends away from the recess wall;
  (ii) a plurality of threads projecting radially outwardly from a threaded section of the exterior portion; the threaded section having a radial length measured from the recess wall, wherein the radial length of the threaded section is greater than a radial length of the base surface from the recess wall;
  (iii) a housing seal member operably held in the seal holder recess; and
  (iv) a bevel surface extending along a straight continuous surface from the base surface to the threaded section.

2. The filter cartridge of claim 1 wherein:
(a) the outwardly radially projecting rib is even with a first end of the connecting and sealing portion.

3. The filter cartridge of claim 1 wherein:
(a) the outwardly radially projecting rib is spaced from a first end of the connecting and sealing portion.

4. The filter cartridge of claim 1 wherein the seal holder recess includes a radially extending base surface and a recess wall extending axially at least partially between the base surface and a first end of the connecting and sealing portion; and
(a) the base surface is located at least 4 mm and no greater than 15 mm from an axial rim defining the mouth of the housing.

5. The filter cartridge of claim 3 wherein:
(a) the bevel surface is angled relative to the threaded section at an angle between 10-50°.

6. The filter cartridge of claim 1 wherein:
(a) the connecting and sealing portion includes a radially extending stop member between the threaded section and a second end of the connecting and sealing portion.

7. The filter cartridge of claim 6 wherein:
(a) the stop member projects radially outwardly a distance greater than any other portion of the connecting and sealing portion.

8. The filter cartridge of claim 1 wherein:
(a) the filter media construction comprises a cylinder of pleated filter media secured between first and second end caps.

9. The filter cartridge of claim 8 wherein:
(a) a ring projects axially from the first end cap in a direction away from a remaining part of the filter media construction; and
(b) a first end cap seal member is held by the ring.

10. The filter cartridge of claim 9 wherein:
(a) the first end cap seal member projects radially outwardly from the ring.

11. The filter cartridge of claim 1 wherein:
(a) the filter media construction is fixed and non-removably mounted in the interior volume of the housing.

12. The filter cartridge of claim 1 wherein:
(a) the bottom of the housing includes a drain valve.

13. The filter cartridge of claim 1 wherein:
(a) the housing seal member projects radially outwardly farther than the rib.

14. The filter cartridge of claim 1 wherein the housing is plastic.

15. The filter cartridge of claim 1 wherein the connecting and sealing portion is a separate sleeve.

16. The filter cartridge of claim 1 wherein the bevel surface has an axial length between the base surface and the threaded section of 0.7-2 mm.

* * * * *